(12) United States Patent
Aker et al.

(10) Patent No.: US 11,437,907 B2
(45) Date of Patent: Sep. 6, 2022

(54) CHARGE PUMP ARCHITECTURE

(71) Applicant: SK hynix Inc., Gyeonggi-do (KR)

(72) Inventors: Onur Aker, Agrate Brianza (IT);
Marco Passerini, Agrate Brianza (IT)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/461,597

(22) Filed: Aug. 30, 2021

(65) Prior Publication Data
US 2022/0255423 A1    Aug. 11, 2022

(30) Foreign Application Priority Data

Feb. 5, 2021    (IT) .......................... 102021000002585

(51) Int. Cl.
*H02M 3/07*    (2006.01)

(52) U.S. Cl.
CPC .................................. *H02M 3/073* (2013.01)

(58) Field of Classification Search
CPC ...................................................... H02M 3/077
See application file for complete search history.

(56) References Cited

U.S. PATENT DOCUMENTS

| | | | | |
|---|---|---|---|---|
| 6,476,666 | B1 * | 11/2002 | Palusa | H02M 3/073 327/390 |
| 6,501,325 | B1 * | 12/2002 | Meng | H02M 3/073 327/536 |
| 6,995,603 | B2 * | 2/2006 | Chen | H02M 3/073 363/60 |
| 7,023,260 | B2 * | 4/2006 | Thorp | H02M 3/073 327/536 |
| 7,932,770 | B2 * | 4/2011 | Yamahira | H02M 3/073 363/60 |

(Continued)

FOREIGN PATENT DOCUMENTS

| KR | 1020130074050 A | 7/2013 |
|---|---|---|
| KR | 101983386 B1 | 6/2019 |

OTHER PUBLICATIONS

Boyu Shen et al., Zero Reversion Loss, High-Efficiency Charge Pump for Wide Output Current Load Range, 2018 IEEE International Symposium on Circuits and Systems, May 27, 2018, pp. 1-5, IEEE.

(Continued)

*Primary Examiner* — Thomas J. Hiltunen
(74) *Attorney, Agent, or Firm* — IP & T Group LLP

(57) ABSTRACT

Disclosed herein is a charge pump architecture in which boosting capacitors of adjacent stages are connected only by NMOS type transistors and comprising a first stage receiving a first voltage and outputting an internal voltage; a second stage receiving the internal voltage and outputting a second voltage at an output terminal, and an auxiliary stage connected to the output terminal, the first stage and second stage including a first type of MOS transistors transferring the voltage from input node internal boosting nodes and being cross-coupled; a second type of MOS transistors with their gate biased by a third type of MOS transistors and fourth type of MOS transistors; the third type of MOS transistors connecting the gate of the second type of MOS transistors; and the fourth type of MOS transistors connecting the gate of the second type of MOS transistors.

16 Claims, 15 Drawing Sheets

(56) References Cited

U.S. PATENT DOCUMENTS

| | | | | |
|---|---|---|---|---|
| 8,547,168 B2* | 10/2013 | Kok | ............... | H02M 3/07 |
| | | | | 327/536 |
| 2002/0130703 A1* | 9/2002 | Tsai | ............... | H02M 3/073 |
| | | | | 327/536 |
| 2008/0169864 A1* | 7/2008 | Yamahira | ............... | H02M 3/073 |
| | | | | 327/536 |
| 2008/0186081 A1 | 8/2008 | Yamahira et al. | | |
| 2009/0237149 A1 | 9/2009 | Ueda | | |

OTHER PUBLICATIONS

Search report issued by the Italian Patent Office dated Sep. 30, 2021.
Wang, X., et al., A High Efficiency CMOS Charge Pump for Low Voltage Operation, IEEE, Sep. 2009, pp. 320-323.
Jiang, X., et al., High-Efficiency Charge Pumps for Low-Power On-Chip Applications, IEEE Transactions on Circuits and Systems-I: Regular Papers, Mar. 2018, pp. 1143-1153, vol. 65, No. 3.

* cited by examiner

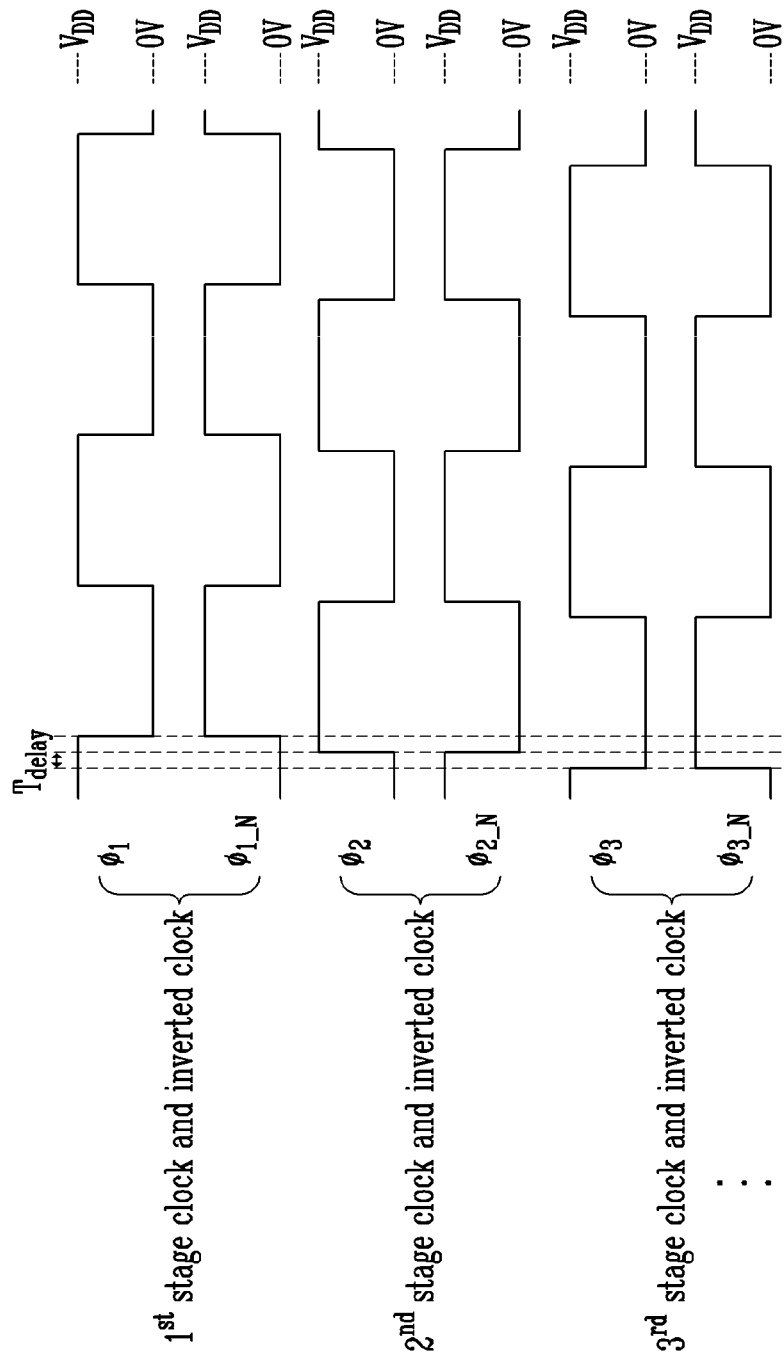

CHARGE PUMP ARCHITECTURE

CROSS-REFERENCE TO RELATED APPLICATION

This application claims priority based upon Italian patent application No. 102021000002585, filed on Feb. 5, 2021, the disclosure of which is hereby incorporated in its entirety by reference herein.

BACKGROUND

Field of the Invention

The present disclosure relates to charge pump architecture.

Background of the Invention

A charge pump circuit is a device using capacitors as energy-storage elements to function as a voltage boosting converter.

One of the most popular charge pump circuit is based on voltage doubler and it is also known as the Pelliconi charge pump and it usually comprises a plurality of NMOS and PMOS transistors, being cross coupled with one another and connected to boost capacitors, suitably organized into stages in cascade to one another to provide a stepped boosting effect.

As a state of the art, the Pelliconi charge pump is schematically shown in FIG. 1A. More particularly, the depicted charge pump 100 is a 2-stage charge pump circuit; however, any number of stages can be inserted in order to make a N-stages charge pump circuit.

The charge pump 100 comprises a first stage 110 connected to an input terminal IN receiving an input voltage Vin and to a second stage 120, in turn connected to an output terminal OUT providing an output voltage Vout, the first stage 110 and second stage 120 being interconnected corresponding to an internal node INT being at an internal voltage V1.

The first stage 110 comprises a first NMOS transistor MN1a and a first PMOS transistor MP1a inserted, in series with one another, between the input terminal IN and the internal node INT and interconnected to one another at a first circuit node X1a, in turn connected to a first boost capacitor C1a driven by a clock signal CK. Moreover, the first stage 110 comprises a second NMOS transistor MN1b and a second PMOS transistor MP1b inserted, in series with one another, between the input terminal IN and the internal node INT and interconnected to one another at a second circuit node X1b, in turn connected to a second boost capacitor C1b driven by an inverted clock signal CKb, having inverted values with respect to the clock signal CK.

Furthermore, the transistors of the first stage 110 are cross coupled. In particular, first NMOS transistor MN1a and first PMOS transistor MP1a have respective control or gate terminals connected to second circuit node X1b, and second NMOS transistor MN1b and second PMOS transistor MP1b have respective control or gate terminals connected to the first circuit node X1a.

Similarly, the second stage 120 comprises a first NMOS transistor MN2a and a first PMOS transistor MP2a inserted, in series with one another, between the internal node INT and the output terminal OUT and interconnected to one another at a first circuit node X2a, in turn connected to a first boost capacitor C2a driven by the inverted clock signal CKb. Moreover, the second stage 120 comprises a second NMOS transistor MN2b and a second PMOS transistor MP2b inserted, in series with one another, between the internal node INT and the output terminal OUT and interconnected to one another at a second circuit node X2b, in turn connected to a second boost capacitor C2b driven by the clock signal CK.

Also, the transistors of the second stage 120 are cross coupled. In particular, first NMOS transistor MN2a and first PMOS transistor MP2a have respective control or gate terminals connected to second circuit node X2b, and second NMOS transistor MN2b and second PMOS transistor MP2b have respective control or gate terminals connected to first circuit node X2a. The voltage and clock signals of the charge pump 100 are shown in FIG. 1B for the first stage 110 and FIG. 1C for the second stage 120. In particular, it is clear that the first stage 110 receives the input voltage Vin at its input terminal IN having a value equal to VCC and provides at the internal node INT the internal voltage V1 equal to 2VCC, voltages Vboost1 and Vboost1b at the first circuit node X1a and second circuit node X1b, respectively, being opposite to one another and ranging between VCC and 2VCC while clock signals CK and CKb range between 0 and VCC, as shown in FIG. 1B.

Similarly, the second stage 120 receives the internal voltage V1 having a value equal to 2VCC and provides at the output terminal OUT the output voltage Vout equal to 3VCC, voltages Vboost2b and Vboost2 at the first circuit node X2a and second circuit node X2b, respectively, being opposite to one another and ranging between 2VCC and 3VCC while clock signals CK and CKb range between 0 and VCC, as shown in FIG. 1C.

As the state of the art, the Pelliconi charge pump has been widely used in many applications including flash memory devices.

One of the drawbacks of using this charge pump topology is related to the resistance between the boost capacitors of two stages, for example the resistance between the first boost capacitor C1a of the first stage 110 and the first boost capacitor C2a of the second stage 120 or the resistance between the second boost capacitor C1b of the first stage 110 and the second boost capacitor C2b of the second stage 120, as shown in FIG. 1A. Since one NMOS transistor and one PMOS transistor connects the first boost capacitors, C1a and C2a, or the second boost capacitors, C1b and C2b, of the two stages, the total resistance between the two boost capacitors is the sum of the on-state resistance of the NMOS transistor and the on-state resistance of PMOS transistor. This parasitic resistance should be minimized in order to reduce the conduction losses in a charge pump stage.

Moreover, a second drawback is related to the usage of PMOS itself. In fact, it is well known that in a PMOS transistor hole mobility is lower than electron mobility in a NMOS transistor. This effect forces a charge pump designer to use a larger width for PMOS transistor with respect to NMOS transistors to compensate for reduced hole mobility. Typically, an increase in width factor ranging from 2 to 3 should be used depending on hole to electron mobility ratio. The usage of too large transistors in a charge pump stage has the negative effect of increasing parasitic capacitance on circuits nodes X1a, X1b, X2a, X2b of the first stage 110 and second stage 120, respectively, thus reducing charge pump efficiency.

CTS charge pumps have been proposed as a method to use only one transistor between two stages of a charge pump, as described in X. Jiang, X. Yu, K. Moez, D. G. Elliott, and J. Chen, "High-efficiency charge pumps for low-power on-chip applications," IEEE Trans. Circuits Syst. I, Reg. Papers, vol. 65, no. 3, pp. 1143-1153, Mar. 2018. For example, in FIG. 2A, a cross-coupled 2-stages PMOS CTS charge pump is represented.

The charge pump 200 comprises a first stage 210 connected to an input terminal IN receiving a first or input voltage Vin and a second stage 220, in turn connected to an output terminal OUT providing an output voltage Vout, the first stage 210 and second stage 220 being interconnected corresponding to third and fourth circuit nodes X2a and X2b.

The first stage 210 comprises a first NMOS transistor MN1a and a first PMOS transistor MP1a inserted, in series with one another, between the input terminal IN and the third circuit node X2a and interconnected to one another at a first circuit node X1a, in turn connected to a first boost capacitor C1a driven by a clock signal CK. Moreover, the first stage 210 comprises a second NMOS transistor MN1b and a second PMOS transistor MP1b inserted, in series with one another, between the input terminal IN and the fourth circuit node X2b and interconnected to one another at a second circuit node X1b, in turn connected to a second boost capacitor C1b driven by an inverted clock signal CKb, having inverted values with respect to the clock signal CK.

Furthermore, the NMOS transistors of the first stage 210 are cross coupled. In particular, the control gate of first NMOS transistor MN1a is connected to second circuit node X1b while the control gate of second NMOS transistor MN1b is connected to the first circuit node X1a.

Second or output stage 220 comprises cross coupled third PMOS transistor MP2a and fourth PMOS transistor MP2b inserted between third circuit node X2a and output terminal OUT and between fourth circuit node X2b and output terminal OUT, respectively.

In particular, the control gate of third PMOS transistor MP2a is connected to fourth circuit node X2b, in turn connected to a fourth boosting capacitor C2b driven by a clock signal CK, while the control gate of fourth PMOS transistor MP2b is connected to third circuit node X2a, in turn connected to a third boosting capacitor C2a driven by an inverted clock signal CKb, having inverted values with respect to the clock signal CK.

Moreover, PMOS transistors MP1a and MP1b of the first stage 210 have their gate terminals controlled by additional NMOS and PMOS transistors in an arrangement which is typical of CTS architecture. In particular, a first additional NMOS transistor MNAUX1a is connected between the second circuit node X1b and a control gate of first PMOS transistor MP1a and has a control gate connected to a first internal circuit node Y1a, in turn connected to the first boost capacitor C1a and to the control gate of second NMOS transistor MN1b, as well as a first additional PMOS transistor MPAUX1a connected between the control gate of first PMOS transistor MP1a and the third circuit node X2a and has a control gate connected to the fourth circuit node X2b. Similarly, a second additional NMOS transistor MNAUX1b is connected between the first circuit node X1a and a control gate of second PMOS transistor MP1b and has a control gate connected to a second internal circuit node Y1b, in turn connected to the second boost capacitor C1b and to the control gate of first NMOS transistor MN1a, as well as a second additional PMOS transistor MPAUX1b connected between the control gate of second PMOS transistor MP1b and the fourth circuit node X2b and has a gate terminal connected to third circuit node X2a.

The voltage and clock signals of the CTS charge pump 200 are shown in FIG. 2B for the first stage 210 and FIG. 2C for the second or output stage 220. In particular, it is clear that the first stage 210 receives the input voltage Vin at its input terminal IN having a value equal to VCC and provides voltages Vboost1 and Vboostb1 at the first circuit node X1a and second circuit node X1b, respectively, being opposite to one another and ranging between VCC and 2VCC while clock signals CK and CKb range between 0 and VCC, as shown in FIG. 2B.

Voltage Vboost1b is passed to fourth circuit node X2b by means of second PMOS transistor MP1b having its control gate biased at voltage level Vg2 which ranges between VCC and 3VCC, while voltage Vboost1 is passed to third circuit node X2a by means of first PMOS transistor MP1a having its control gate biased at voltage level Vg1 which also ranges between VCC and 3VCC and being opposite to voltage Vg2.

Output stage 220 receives boosted voltages Vboost1 and Vboost1b and produces boosted voltages Vboost2 and Vboost2b which in turns are passed to output terminal OUT by means of fourth PMOS transistor MP2b and third PMOS transistor MP2a, respectively.

Boosted voltages Vboost2 and Vboost2b being opposite to one another, range between 2VCC and 3VCC while clock signals CK and CKb range between 0 and VCC, as shown in FIG. 2C.

The CTS charge pumps as those shown in FIG. 2A are made by PMOS transistors which have a reduced carrier mobility with respect to NMOS transistors.

Other CTS architecture have been proposed. A CTS charge pump in which both PMOS and NMOS transistors are used is described in the Korean Patent Publication No. KR 10-1983386. In particular, the disclosed CTS circuit architecture has a modified connection configuration of PMOS and NMOS transistors to prevent reduction in efficiency caused by an increased threshold voltage appearing in conventional CTS charge pumps, as the one shown in FIG. 2A. A power supply circuit using pumps and comprising an auxiliary circuit having a cross-coupled configuration is also disclosed in the Korean Patent Publication No. KR 2013-0074050.

SUMMARY OF THE INVENTION

Various embodiments of the present invention are directed to a new charge pump architecture comprising a plurality of stages in cascade to one another, wherein, in each stage, only NMOS switch transistors are being used to connect boosting capacitors of adjacent stages. Additional NMOS and PMOS transistors are used to bias control gates of NMOS switch transistors. Moreover, a delay is provided between clock signals applied to each stage.

The aim of the proposed charge pump architecture is to reduce the power consumption of the charge pump as a whole, thus improving its performances. This can be obtained in an embodiment of this new architecture as the series of two NMOS transistors connects the two boosting capacitors of adjacent stages, to avoid the series of one NMOS transistor and one PMOS transistors connecting the two boosting capacitors of adjacent stages as in the Pelliconi charge pump. Moreover, according to another embodiment of this new architecture, only one NMOS transistor is used to connect the two boosting capacitors of adjacent stages to substitute the PMOS transistor used in the CTS charge pump, using NMOS transistors instead of PMOS transistors being preferable, as carrier mobility is higher in NMOS transistors than PMOS transistors.

Moreover, thanks to the delay of the used clock signals from one stage to another the proposed charge pump architecture is able to effectively reduce back charge conduction effect.

In an embodiment of the present invention, a charge pump architecture comprises: an input terminal and an output terminal, a first stage receiving a first voltage at its input terminal and outputting a second voltage at its output terminal, the first stage including a first couple of capacitors connected to a first couple of internal boosting nodes, a second stage receiving the second voltage at its input terminal and outputting a third voltage at its output terminal, the second stage including a second couple of capacitors connected to a second couple of internal boosting nodes, and an auxiliary stage receiving the third voltage at its input terminal, the auxiliary stage including a third couple of capacitors connected to a third couple of internal boosting nodes, wherein the input terminal of the charge pump architecture corresponds to the input terminal of the first stage, and the output terminal of the charge pump architecture corresponds to the output terminal of the second stage and the input terminal of the auxiliary stage, wherein each of the first stage and second stage comprises: the input terminal and the output terminal of the stage, a first type of MOS transistors transferring the voltage from the input terminal to the couple of internal boosting nodes and being cross-coupled, and a second type of MOS transistors with their gate biased by a third type of MOS transistors and a fourth type of MOS transistors, the third type of MOS transistors connecting the gates of the second type of MOS transistors to the couple of internal boosting nodes of the stage, and the fourth type of MOS transistors connecting the gates of the second type of MOS transistors to the couple of internal boosting nodes of the next stage.

According to another embodiment of the present invention, the charge pump architecture comprises: an input terminal and an output terminal, a first stage receiving a first voltage at its input terminal and outputting first and second boost voltages at its first and second output terminals, respectively, the first stage including a first couple of capacitors connected to the first and second output terminals, a first intermediate stage receiving the first and second boost voltages at its first and second input terminals, respectively, from the first stage and outputting third and fourth boost voltages at its first and second output terminals, respectively, the first intermediate stage including a second couple of capacitors connected to its first and second output terminals, a second or last intermediate stage receiving the third and fourth boost voltages at its first and second input terminals, respectively, from the first intermediate stage and outputting fifth and sixth boost voltages at its first and second output terminals, respectively, the second intermediate stage including a third couple of capacitors connected to its first and second output terminals, and a final stage receiving the fifth and sixth boost voltages at its first and second input terminals, respectively, from the second intermediate stage and outputting an output voltage at an output terminal, wherein the input terminal of the charge pump architecture corresponds to the input terminal of the first stage and the output terminal of the charge pump architecture corresponds to the output terminal of the final stage, wherein the first stage includes: the input terminal and the first and second output terminals, and a first type of MOS transistors transferring a voltage from the input terminal to the first and second output terminals and being cross-coupled, and wherein the first and second intermediate stage include: the first and second input terminals and the first and second output terminals, a second type of MOS transistors transferring the boost voltages from the first and second input terminals of the stage to the first and second output terminals of the stage, a third type of MOS transistors connecting gates of the second type of MOS transistors of the stage to the first and second input terminals of the stage, and a fourth type of MOS transistors connecting the gates of the second type of MOS transistors of the stage to the first and second output terminals of the stage, and wherein the final stage includes: the first and second input terminals and the output terminal, a fifth type of MOS transistors transferring the fifth and sixth boost voltages from the first and second input terminals of the stage to the output terminal of the stage and being cross-coupled.

According to another embodiment of the present invention, the charge pump architecture comprises: an input terminal and an output terminal, at least a first stage receiving a first voltage at its input terminal, being also the input terminal of the charge pump, and outputting a second voltage at its output terminal, at least a second stage receiving the second voltage from the first stage as an input voltage at its input terminal and outputting a third voltage at its output terminal, being also the output terminal of the charge pump, and an auxiliary stage receiving the output voltage of a last stage, namely the second stage, as an input at its input terminal and controlling internal node voltages of the last stage, wherein the first and second stage include first transistors transferring the input voltage to internal boosting nodes of the stage, being first type of NMOS transistors; second transistors transferring the internal boosting voltages of the stage to the output voltage, being second type of NMOS transistors; third and fourth transistors controlling a gate of second transistors, being third type of NMOS transistors and fourth type of PMOS transistors respectively.

According to an embodiment of the present invention, the charge pump architecture may use a clock signal and inverted clock signal connected to each stage which are shifted from one another by a delay period, inserted in the clock signal and inverted clock signal driving a stage to anticipate the shifted clock signals with respect to the clock signal and inverted clock signal of a previous stage.

BRIEF DESCRIPTION OF THE DRAWINGS

The characteristics and advantages of the present disclosure will be apparent from the following description of embodiments thereof given by way of indicative and not limiting example with reference to the annexed drawings, in which

FIG. 9 shows clock signals of a charge pump architecture according to an embodiment of the present invention.

DETAILED DESCRIPTION OF THE EMBODIMENTS

Figure 1A:
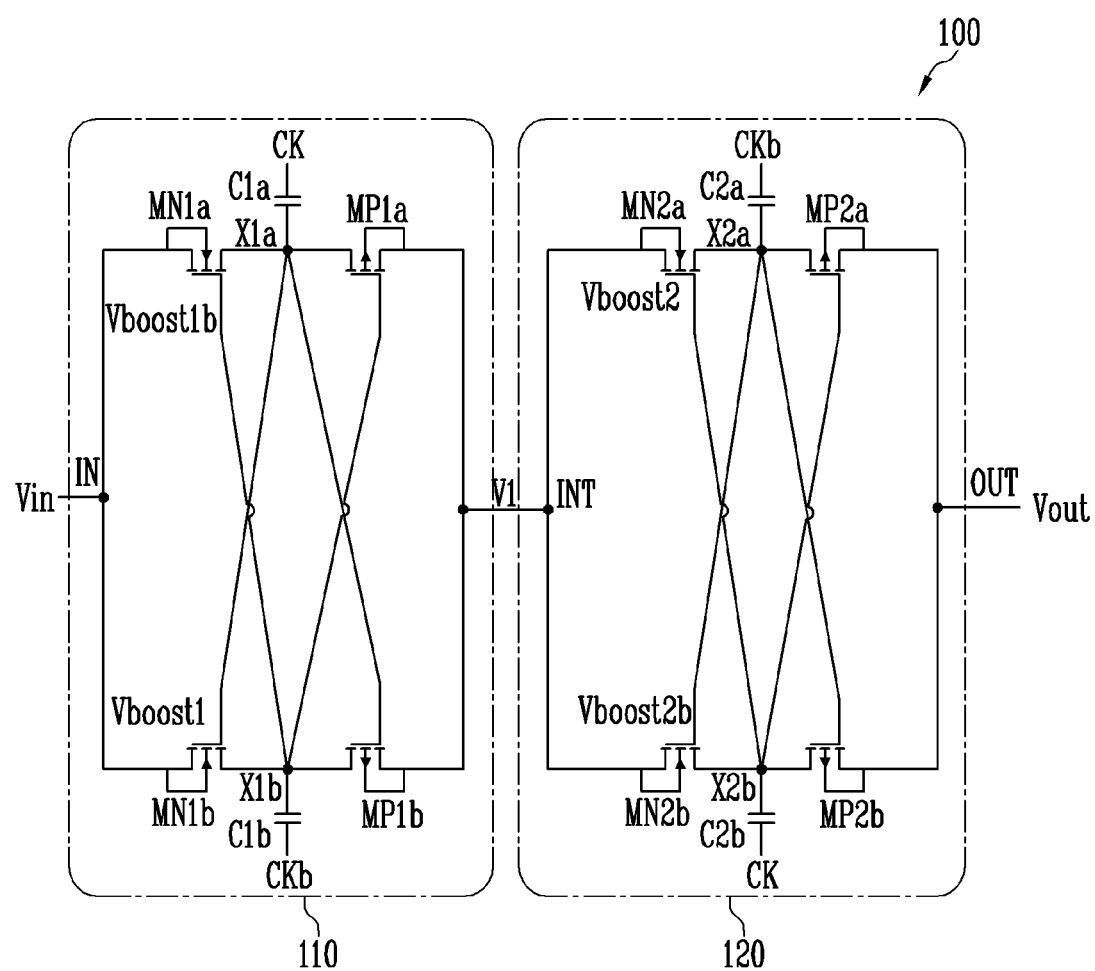
FIG. 1A shows a Pelliconi charge pump according to conventional technology.
Figure 1B:
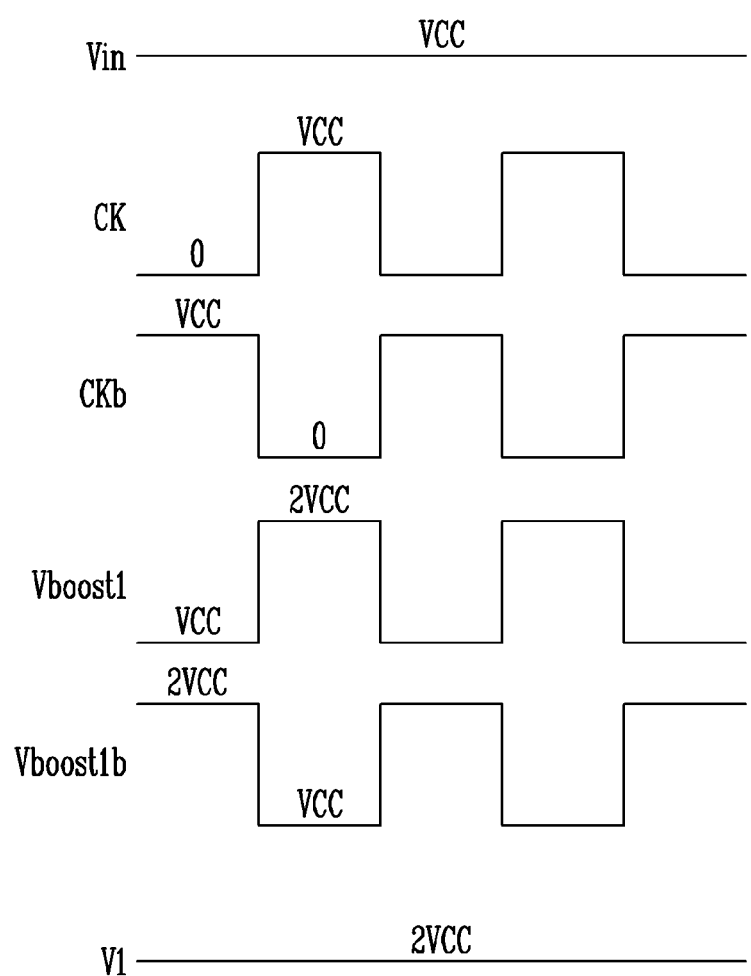
FIGS. 1B-1C show internal signals of the Pelliconi charge pump of FIG. 1A.
Figure 1C:
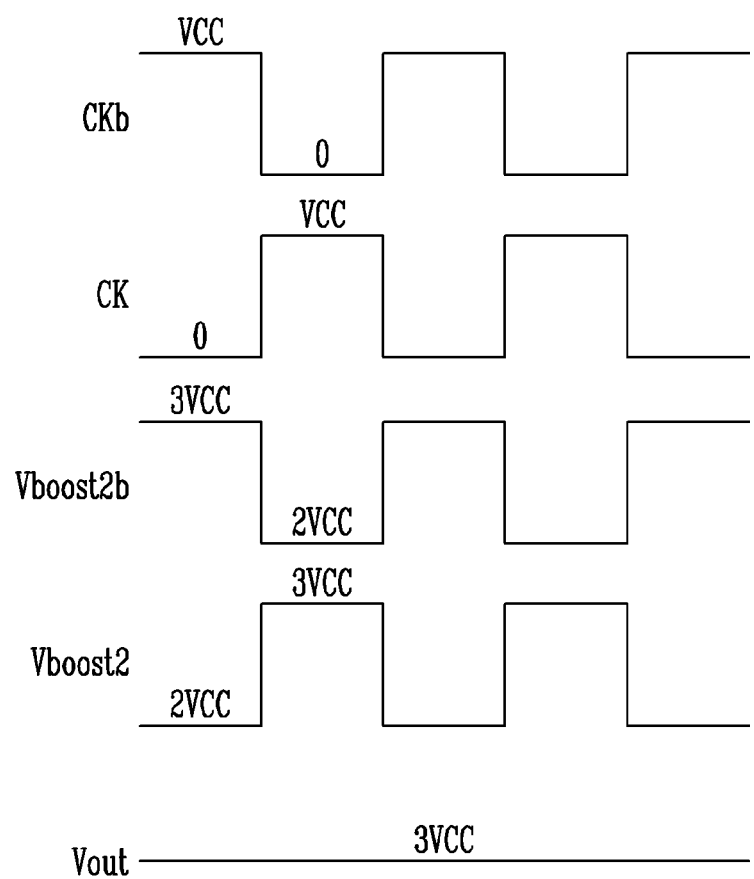
Figure 2A:
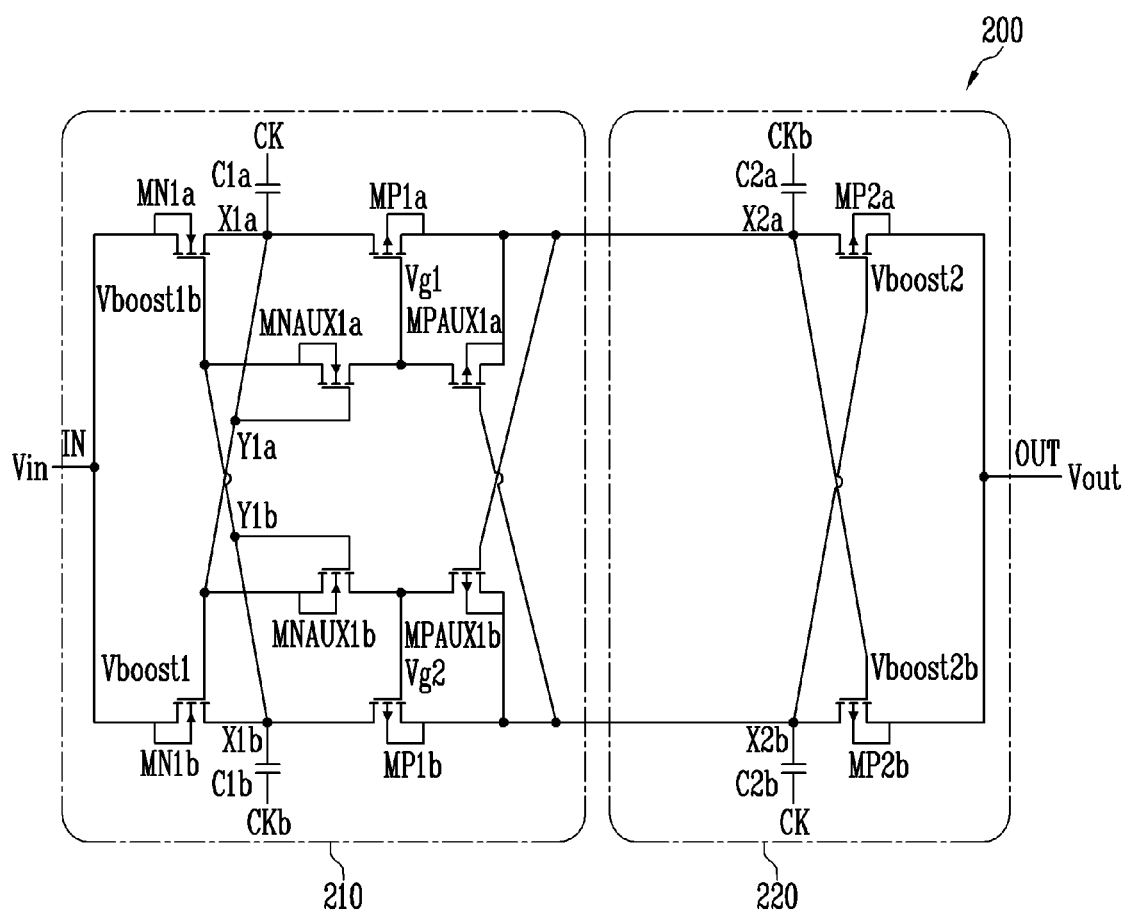
FIG. 2A shows a cross-coupled CTS charge pump according to conventional technology.
Figure 2B:
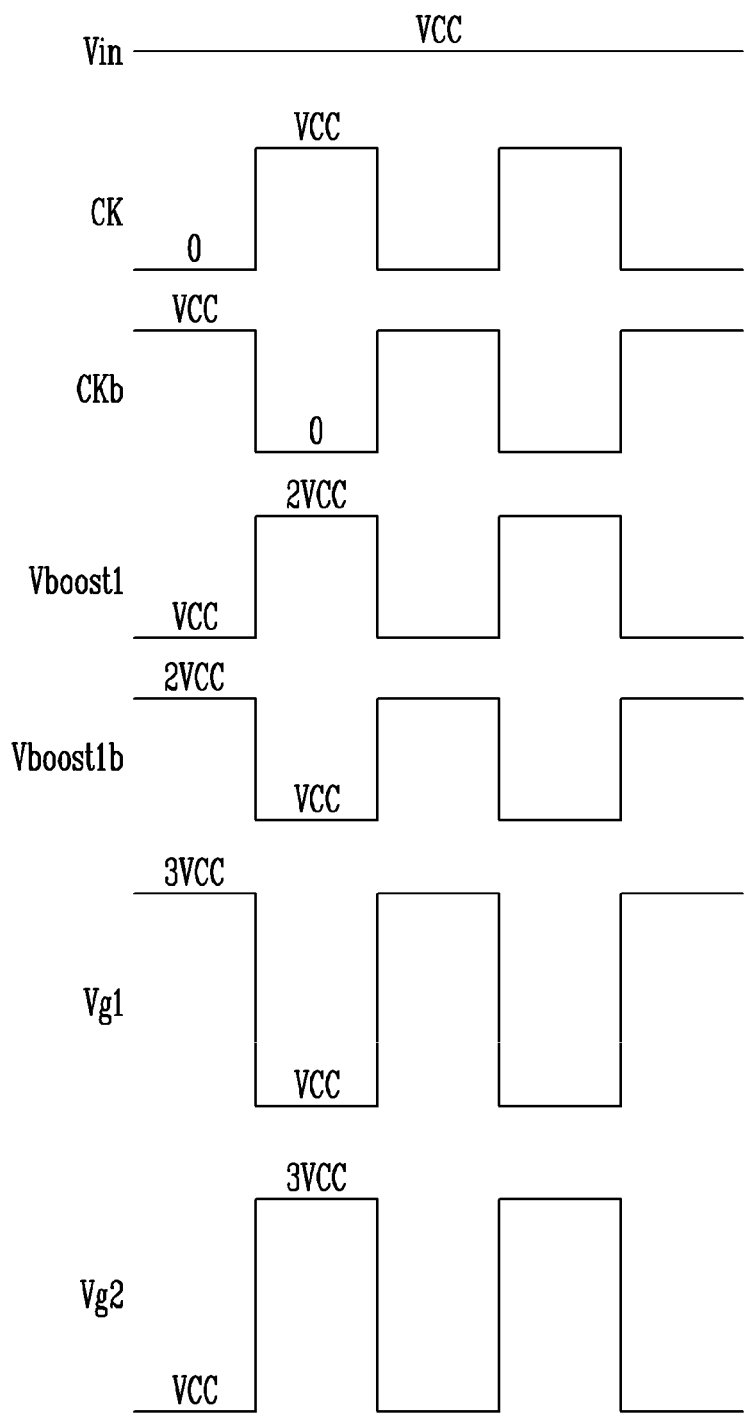
FIGS. 2B-2C show internal signals of the cross-coupled CTS charge pump of FIG. 2A.
Figure 2C:
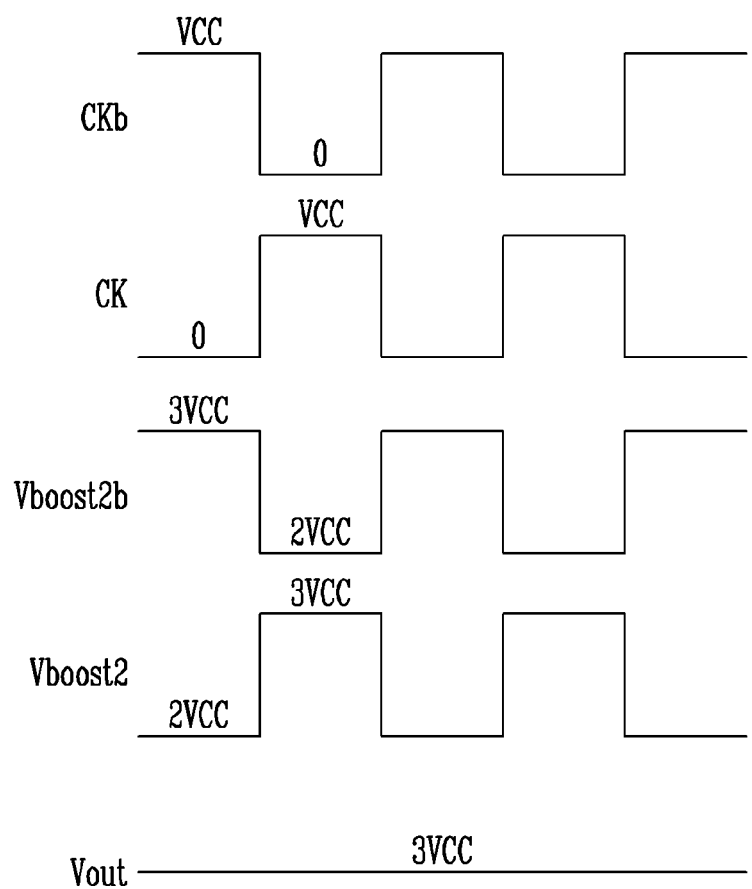

Various embodiments of the present invention will be described in detail below with reference to the accompanying drawings. While the present invention is shown and described in connection with embodiments thereof, it will be apparent to those skilled in the art that various modifications can be made without departing from the spirit and scope of the invention. In addition, detailed descriptions of constructions being well known in the art may be omitted to avoid unnecessarily obscuring the clarity of the present invention.

In the drawings, corresponding features are identified by the same reference numerals.

Figure 3:
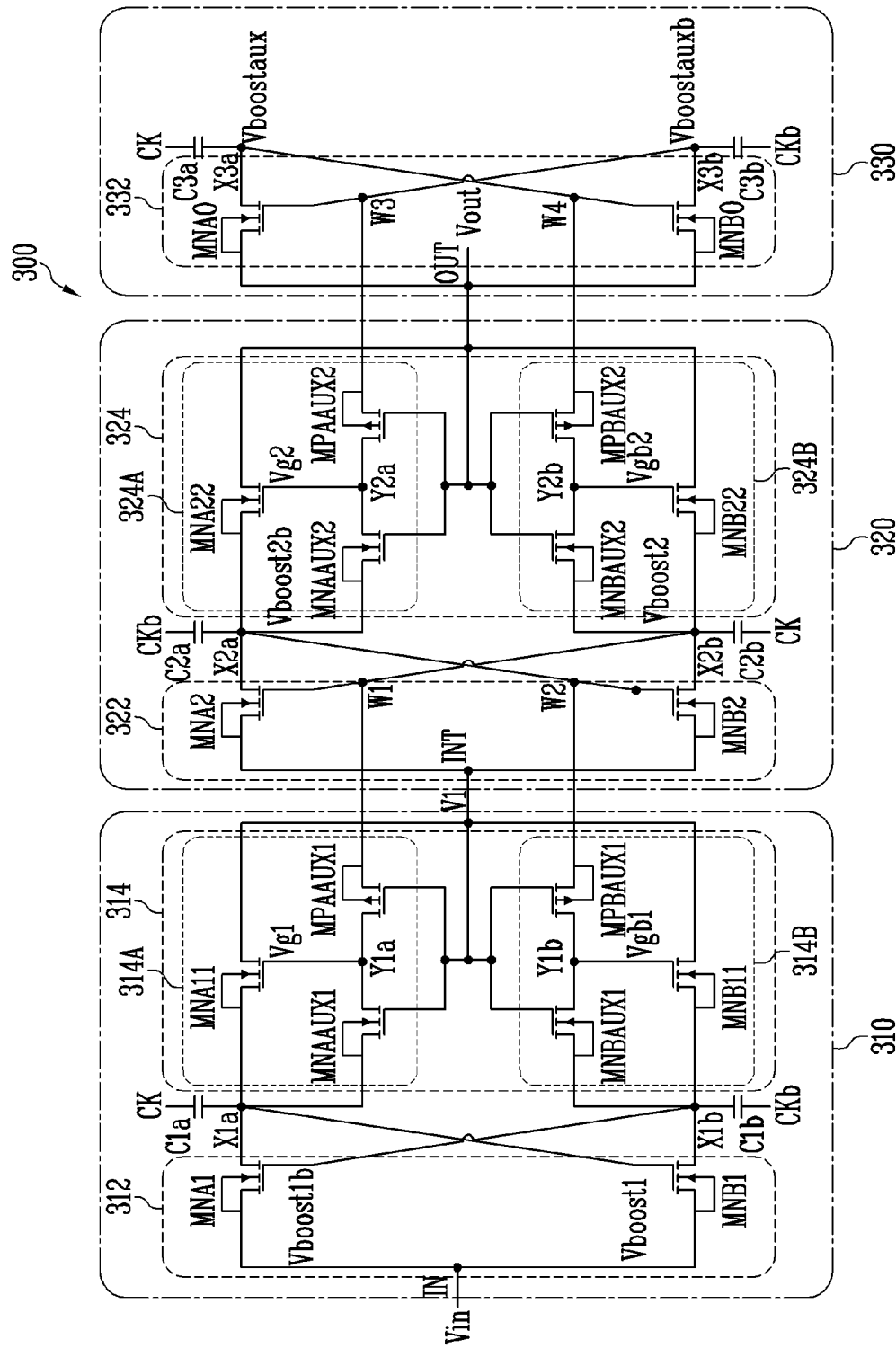
FIG. 3 shows a charge pump architecture according to an embodiment of the present invention.

FIG. 3 schematically shows a charge pump architecture 300 according to an embodiment of the present invention.

The charge pump architecture 300 comprises a first stage 310 connected to an input terminal IN of the charge pump and receiving an input voltage Vin as a first voltage and a second stage 320 connected to an output terminal OUT of the charge pump and providing an output voltage Vout, in series to one another and interconnected at an internal node INT being at an internal voltage V1 as a second voltage. The first stage 310 comprises a first couple of capacitors C1a, C1b respectively driven by a clock signal CK and an inverted clock signal CKb, and the second stage 320 comprises a second couple of capacitors C2a, C2b, respectively driven by the inverted clock signal CKb and the clock signal CK. The charge pump architecture 300 further comprises an auxiliary stage 330, in turn comprising a third couple of capacitors C3a, C3b driven by the clock signal CK and the inverted clock signal CKb, respectively.

More particularly, the first stage 310 comprises a first switching block 312 connected between the input terminal IN and the first couple of capacitors C1a, C1b and including a first NMOS transistor MNA1 inserted between the input terminal IN and a first circuit node X1a, in turn connected to a first capacitor C1a of the first couple and a second NMOS transistor MNB1 inserted between the input terminal IN and a second circuit node X1b, in turn connected to a second capacitor C1b of the first couple. Moreover, the first NMOS transistor MNA1 has a control or gate terminal connected to the second circuit node X1b and the second NMOS transistor MNB1 has a control or gate terminal connected to the first circuit node X1a. The first NMOS transistor MNA1 provides the first capacitor C1a of the first couple with a first boost voltage Vboost1 at the first circuit node X1a, being also connected to the gate terminal of the second NMOS transistor MNB1, which in turn provides the second capacitor C1b of the first couple with a second inverted boost voltage Vboost1b at the second circuit node X1b, being also connected to the gate terminal of the first NMOS transistor MNA1. In an embodiment, the first NMOS transistor MNA1 and the second NMOS transistor MNB1 may be triple-well NMOS transistors having bulk terminals connected to their source terminals in the embodiment of FIG. 3. However, other schemes known in the state of the art can be used to change the bulk terminal connection according to the charging pump phases in order to avoid the bulk to drain forward biasing during boosting or charge pump output drop.

The first circuit node X1a and the second circuit node X1b of the first stage 310 are thus respectively first and second internal boosting nodes of the first stage 310.

The first stage 310 further comprises a second switching block 314 connected between the first circuit node X1a and the second circuit node X1b and the internal node INT and including a first switching transistors structure 314A inserted between the first circuit node X1a and the internal node INT, as well as a second switching transistors structure 314B inserted between the second circuit node X1b and the internal node INT, such the first switching transistors structure 314A and the second switching transistors structure 314B being interconnected to one another at the internal node INT being at the internal voltage V1.

More particularly, the first switching transistors structure 314A comprises a first switching NMOS transistor MNA11 inserted between the first circuit node X1a and the internal node INT and having a control or gate terminal connected to a first internal circuit node Y1a, a first additional switching NMOS transistor MNAAUX1 inserted between the first circuit node X1a and the first internal circuit node Y1a and having a control or gate terminal connected to the internal node INT and to the second switching transistors structure 314B and a second additional switching PMOS transistor MPAAUX1 inserted between the first internal circuit node Y1a and a first interconnecting node W1 and having a control or gate terminal connected to the internal node INT and to the second switching transistors structure 314B. The first switching NMOS transistor MNA11 and the first additional switching NMOS transistor MNAAUX1 of the first switching transistors structure 314A may be triple-well NMOS transistors having bulk terminals connected to their source terminals in the embodiment of FIG. 3. However, other schemes known in the state of the art can be used to change the bulk terminal connection according to the charging pump phases to avoid bulk to drain forward biasing during boosting or charge pump output drop. Second additional switching transistor MPAAUX1 is on the other hand, a PMOS transistor with the bulk connected to its source. Also, for this PMOS transistor, a more complex scheme could be implemented to manage bulk connection to avoid drain to bulk forward biasing during boosting or charge pump output drop.

In a symmetrical way, the second switching transistors structure 314B comprises a first switching NMOS transistor MNB11 inserted between the second circuit node X1b and the internal node INT and having a control or gate terminal connected to a second internal circuit node Y1b, a first additional switching NMOS transistor MNBAUX1 inserted between the second circuit node X1b and a second internal circuit node Y1b and having a control or gate terminal connected to the internal node INT and to the first switching transistors structure 314A, and a second additional switching PMOS transistor MPBAUX1 inserted between the second internal circuit node Y1b and a second interconnecting node W2 and having a control or gate terminal connected to the internal node INT and to the first switching transistors structure 314A. The first switching NMOS transistor MNB11 and the first additional switching NMOS transistor MNBAUX1 of the second switching transistors structure 314B may be triple-well NMOS transistors having bulk terminals connected to their source terminals in the embodiment of FIG. 3. However, other schemes known in the state of the art can be used to change the bulk terminal connection according to the charging pump phases to avoid bulk to drain forward biasing during boosting or charge pump output drop. Second additional switching transistor MPBAUX1 is on the other hand, a PMOS transistor with the bulk connected to its source. Also, for this PMOS transistor, a more complex scheme could be implemented to manage bulk connection to avoid drain to bulk forward biasing during boosting or charge pump output drop. The first internal circuit node Y1a is at a first control voltage Vg1 and the second internal circuit node Y1b is at an inverted first control voltage Vgb1.

The second stage 320 has a same structure as the first stage 310.

More particularly, the second stage 320 comprises a first switching block 322 connected between the internal node INT and the second couple of capacitors C2a, C2b and including a first NMOS transistor MNA2 inserted between the internal node INT and a first circuit node X2a, in turn connected to a first capacitor C2a of the second couple and a second NMOS transistor MNB2 inserted between the internal node INT and a second circuit node X2b, in turn connected to a second capacitor C2b of the second couple. Moreover, the first NMOS transistor MNA2 has a control or gate terminal connected to the second circuit node X2b and the second NMOS transistor MNB2 has a control or gate terminal connected to the first circuit node X2a. The first NMOS transistor MNA2 provides the first capacitor C2a of the second couple with a third inverted boost voltage Vboost2b at the first circuit node X2a and the second NMOS transistor MNB2 provides the second capacitor C2b of the second couple with a fourth boost voltage Vboost2 at the second circuit node X2b. The first NMOS transistor MNA2 and the second NMOS transistor MNB2 may be triple-well NMOS transistors having bulk terminals connected to their source terminals in the embodiment of FIG. 3. However, other schemes known in the state of the art can be used to change the bulk terminal connection according to the charging pump phases to avoid bulk to drain forward biasing during boosting or charge pump output drop.

The first circuit node X2a and the second circuit node X2b of the second stage 320 are thus respectively first and second internal boosting nodes of the second stage 320.

The second stage 320 further comprises a second switching block 324 connected between the first circuit node X2a and second circuit node X2b and the output terminal OUT and including a first switching transistors structure 324A inserted between the first circuit node X2a and the output terminal OUT, as well as a second switching transistors structure 324B inserted between the second circuit node X2b and the output terminal OUT, such first switching transistors structure 324A and second switching transistors structure 324B being interconnected to one another at the output terminal OUT.

More particularly, the first switching transistors structure 324A comprises a first switching NMOS transistor MNA22 inserted between the first circuit node X2a and the output terminal OUT and having a control or gate terminal connected to a first internal circuit node Y2a, a first additional switching NMOS transistor MNAAUX2 inserted between the first circuit node X2a and the first internal circuit node Y2a and having a control or gate terminal connected to the output terminal OUT and to the second switching transistors structure 324B and a second additional switching PMOS transistor MPAAUX2 inserted between the first internal circuit node Y2a and a third interconnecting node W3 and having a control or gate terminal connected to the output terminal OUT and to the second switching transistors structure 324B. The first switching NMOS transistor MNA22 and the first additional switching NMOS transistor MNAAUX2 of the first switching transistors structure 324A may be triple-well NMOS transistors having bulk terminals connected to their source terminals in the embodiment of FIG. 3, however, other schemes known in the state of the art can be used to change the bulk terminal connection according to the charging pump phases to avoid bulk to drain forward biasing during boosting or charge pump output drop. Second additional switching transistor MPAAUX2 is on the other hand a PMOS transistor with the bulk connected to its source. Also, for this PMOS transistor, more complex scheme could be implemented to manage bulk connection to avoid drain to bulk forward biasing during boosting or charge pump output drop.

The first internal circuit node Y2a is at a second control voltage Vg2 and the second internal circuit node Y2b is at an inverted second control voltage Vgb2.

In a symmetrical way, the second switching transistors structure 324B comprises a first switching NMOS transistor MNB22 inserted between the second circuit node X2b and the output terminal OUT and having a control or gate terminal connected to a second internal circuit node Y2b, a first additional switching NMOS transistor MNBAUX2 inserted between the second circuit node X2b and the second internal circuit node Y2b and having a control or gate terminal connected to the output terminal OUT and to the first switching transistors structure 324A and a second additional switching PMOS transistor MPBAUX2 inserted between the second internal circuit node Y2b and a fourth interconnecting node W4 and having a control or gate terminal connected to the output terminal OUT and to the first switching transistors structure 324A. The first switching NMOS transistor MNB22 and the first additional switching NMOS transistor MNBAUX2 of the second switching transistors structure 324B may be triple-well NMOS transistors having bulk terminals connected to their source terminals in the embodiment of FIG. 3. However, other schemes known in the state of the art can be used to change the bulk terminal connection according to the charging pump phases in order to avoid bulk to drain forward biasing during boosting or charge pump output drop. Second additional switching transistor MPBAUX2 is on the other hand a PMOS transistor with the bulk connected to its source. Also for this PMOS transistor a more complex scheme could be implemented to manage bulk connection to avoid drain to bulk forward biasing during boosting or charge pump output drop.

The first stage 310 and the second stage 320 are also connected to one another at the first interconnecting node W1 and the second interconnecting node W2. More particularly, the first interconnecting node W1 is connected to the first switching transistors structure 314A of the second switching block 314 of the first stage 310 and to the second circuit node X2b of the second stage 320 and the second interconnecting node W2 is connected to the second switching transistors structure 314B of the second switching block 314 of the first stage 310 and to the first circuit node X2a of the second stage 320.

The auxiliary stage 330 comprises an auxiliary switching block 332 inserted between the output terminal OUT and a third couple of capacitors C3a, C3b. More particularly, the auxiliary switching block 332 includes a first NMOS transistor MNAO inserted between the output terminal OUT and a first circuit node X3a, in turn connected to a first capacitor C3a of the third couple and a second NMOS transistor MNBO inserted between the output terminal OUT and a second circuit node X3b, in turn connected to a second capacitor C3b of the third couple. Moreover, the first NMOS transistor MNAO has a control or gate terminal connected to the second circuit node X3b and the second NMOS transistor MNBO has a control or gate terminal connected to the first circuit node X3a. The first NMOS transistor MNAO and the second NMOS transistor MNBO of the auxiliary switching block 332 are triple-well NMOS transistors having bulk terminals connected to their source terminals in the embodiment of FIG. 3, however other schemes known in the state of the art can be used to change the bulk terminal connection according to the charging pump phases to avoid bulk to drain forward biasing during boosting or charge pump output drop. The first NMOS transistor MNAO provides the first capacitor C3a of the third couple with a fifth boost voltage Vboostaux at the first circuit node X3a and the second NMOS transistor MNBO provides the second capacitor C3b of the third couple with a sixth inverted boost voltage Vboostauxb at the second circuit node X3b.

The first circuit node X3a and the second circuit node X3b of the auxiliary stage 330 are thus respectively first and second internal boosting nodes of the auxiliary stage 330.

The second stage 320 and the auxiliary stage 330 are also connected to one another at the third interconnecting node W3 and fourth interconnecting node W4. More particularly, the third interconnecting node W3 is connected to the first switching transistors structure 324A of the second switching block 324 of the second stage 320 and the second circuit node X3b of the auxiliary stage 330 and the fourth interconnecting node W4 is connected to the second switching transistors structure 324B of the second switching block 324 of the second stage 320 and the first circuit node X3a of the auxiliary stage 330.

Thus, the charge pump architecture 300 comprises: the first stage 310 receiving the first voltage Vin at the input terminal IN and outputting the second voltage V1; the second stage 320 receiving the second voltage V1 and outputting the output voltage Vout at the output terminal OUT, and the auxiliary stage 330 connected to the output terminal OUT, wherein the first stage 310 comprises a first couple of capacitors C1a, C1b connected to first internal boosting node X1a and second internal boosting node X1b of the first stage 310, respectively, the second stage 320 comprises a second couple of capacitors C2a, C2b connected to first internal boosting node X2a and second internal boosting node X2b of the second stage 320, respectively, and the auxiliary stage 330 comprises a third couple of capacitors C3a, C3b connected to first internal boosting node X3a and second internal boosting node X3b of the auxiliary stage 330, respectively.

Moreover, the first stage 310 comprises respective switching blocks connected to the first couple of capacitors C1a, C1b and including: first type of MOS transistors, in particular NMOS transistors MNA1, MNB1, transferring the input voltage Vin to the first and second internal boosting nodes X1a and X1b of the stage, respectively and being cross-coupled; second type of MOS transistors, in particular NMOS transistors MNA11, MNB11 transferring voltages at the first and second internal boosting nodes X1a and X1b of the stage to the internal node INT and having their gates biased by third type of MOS transistors, MNAAUX1, MNBAUX1 and fourth type of MOS transistors MPAAUX1, MPBAUX1; the third type of MOS transistors, in particular NMOS transistors MNAAUX1, MNBAUX1 connecting the gates of second type of MOS transistors MNA11, MNB11 to first and second internal boosting nodes X1a and X1b of the stage; and fourth type of MOS transistors, in particular PMOS transistors MPAAUX1, MPBAUX1 connecting the gates of second type of MOS transistors MNA11, MNB11 to second and first internal boosting nodes X2b, X2a of a next stage, in particular the second stage 320.

The second stage 320 comprises respective switching blocks connected to the second couple of capacitors C2a, C2b and including: first types of MOS transistors, in particular NMOS transistors MNA2, MNB2 transferring the second voltage V1 to the first and second internal boosting nodes X2a and X2b of the stage, respectively, and being cross coupled; second type of MOS transistors, in particular NMOS transistors MNA22, MNB22, transferring voltages at the first and second internal boosting nodes X2a, X2b of the stage to the output node OUT and having their gate biased by third type of MOS transistors, MNAAUX2, MNBAUX2 and fourth type of MOS transistors MPAAUX2, MPBAUX2; the third type of MOS transistors, in particular NMOS transistors MNAAUX2, MNBAUX2 connecting the gates of second type of MOS transistors MNA22, MNB22 to first and second internal boosting nodes X2a and X2b of the stage; and fourth type of MOS transistors, in particular PMOS transistors MPAAUX2, MPBAUX2 connecting the gates of second type of MOS transistors MNA22, MNB22 to second and first internal boosting nodes X3b and X3a of a next stage, in particular the auxiliary stage 330.

Moreover, the auxiliary stage 330 includes first types of MOS transistors, in particular NMOS transistors MNAO, MNBO connected to the output terminal OUT and being cross coupled.

The charge pump architecture 300 of FIG. 3 is a 2-stage charge pump, the constituent stages thereof being the first stage 310 and the second stage 320, and including the auxiliary stage 330; however, any number of stages can be inserted to make a N-stage charge pump by cascading several stages, being of the type of the first stage 310 or second stage 320, and ending with an auxiliary stage, being of the type of the auxiliary stage 330.

Figure 4:
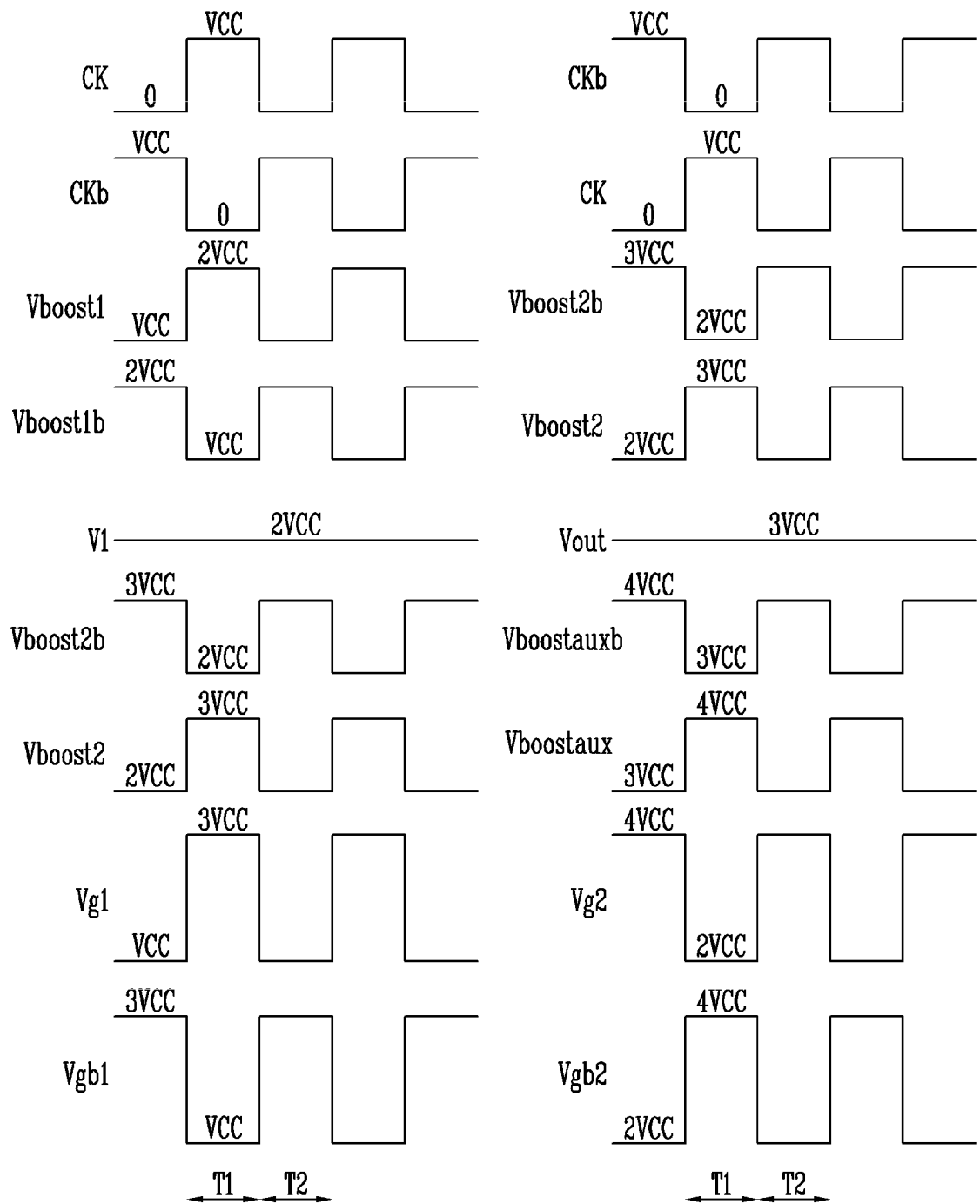
FIG. 4 shows internal signals of the charge pump architecture of FIG. 3 according to an embodiment of the present invention.

The voltage and clock signals of the charge pump architecture 300 are shown in FIG. 4.

In particular, the first stage 310 receives the input voltage Vin at its input terminal IN having a value equal to VCC and provides at the internal node INT the second voltage V1 equal to 2VCC, using the clock signal CK and the inverted clock signal CKb ranging between 0 and VCC. Moreover, the first boost voltage Vboost1 and second inverted boost voltage Vboost1b at the first circuit node X1a and the second circuit node X1b of the first stage 310, respectively, range between VCC and 2VCC and the first control voltage Vg1 and inverted first control voltage Vgb1 at the first internal circuit node Y1a and second internal circuit node Y1b, respectively, range between VCC and 3VCC.

Similarly, the second stage 320 receives the second voltage V1 having a value equal to 2VCC and provides at the output terminal OUT the output voltage Vout equal to 3VCC, using the clock signal CK and the inverted clock signal CKb ranging between 0 and VCC. Moreover, the third inverted boost voltage Vboost2b and fourth boost voltage Vboost2 at the first circuit node X2a and second circuit node X2b of the second stage 320, respectively, range between 2VCC and 3VCC and the second control voltage Vg2 and inverted second control voltage Vgb2 at the first internal circuit node Y2a and second internal circuit node Y2b of the second stage 320, respectively, range between 2VCC and 4VCC.

Finally, the auxiliary stage 330 received the output voltage Vout having a value equal to 3VCC and provides the third couple of capacitors C3a, C3b with fifth boost voltage Vboostaux and sixth inverted boost voltage Vboostauxb at the first circuit node X3a and second circuit node X3b of the auxiliary stage 330, respectively, ranging between 3VCC and 4VCC.

The patterns of the signals shown in FIG. 4 in the charge pump architecture 300 of FIG. 3 provide for alternative on-phases of the transistors included therein.

Figure 5A:
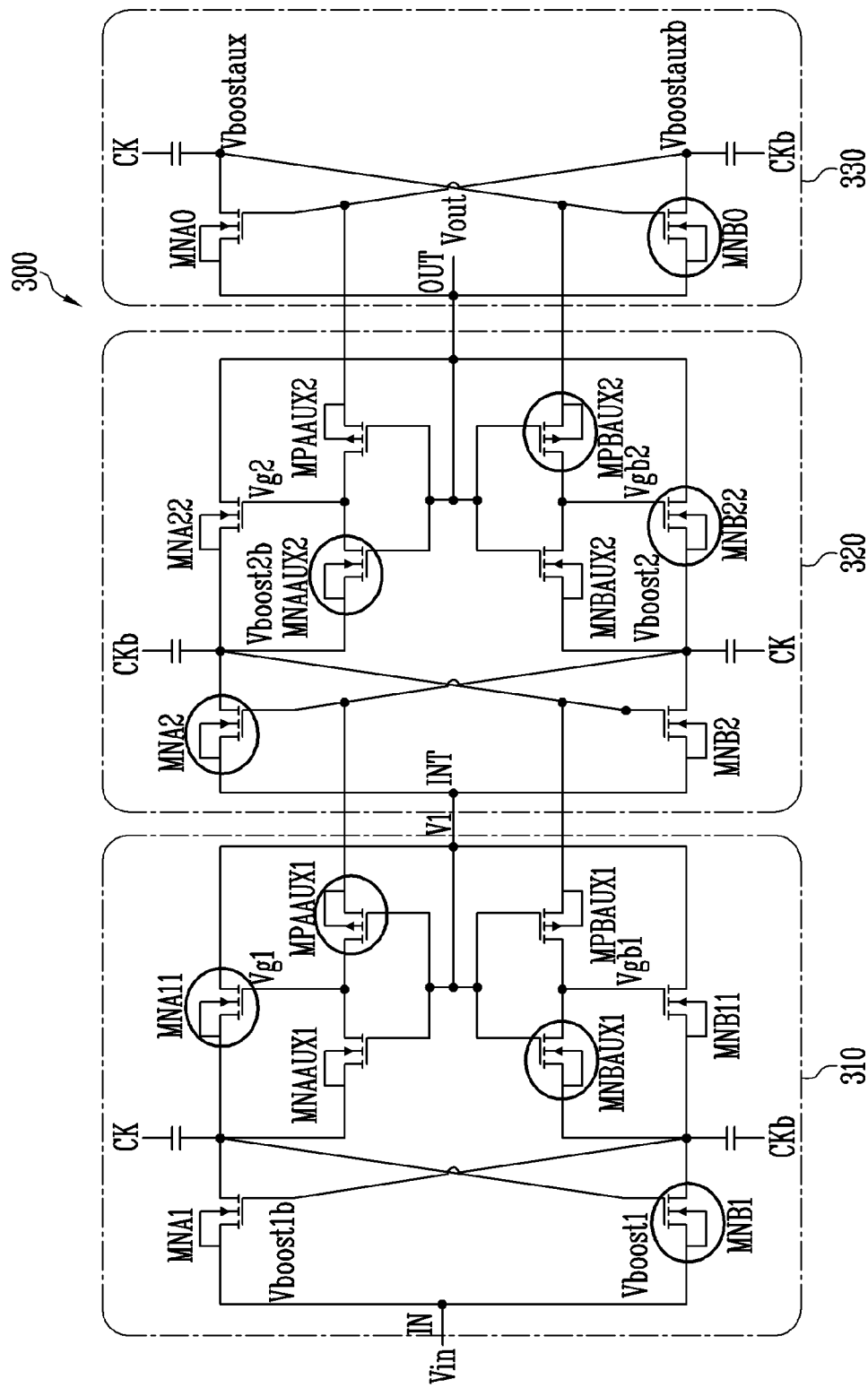
FIGS. 5A-5B show the on transistors of the charge pump architecture of FIG. 3 in different working phases according to an embodiment of the present invention.

More particularly, as shown in FIG. 5A, in a first time period T1, corresponding to a first rising of the clock signal CK to a value equal to VCC, as indicated in FIG. 4, in the first stage 310, the second NMOS transistor MNB1 of the first switching block 312, the first switching NMOS transistor MNA11 and second additional switching PMOS transistor MPAAUX1 of the first switching transistors structure 314A as well as the first additional switching NMOS transistor MNBAUX1 of the second switching transistors structure 314B are ON. In a symmetrical manner, in the second stage 320, the first NMOS transistor MNA2 of the first switching block 322 and the first additional switching NMOS transistor MNAAUX2 of the first switching transistors structure 324A as well as the first switching NMOS transistor MNB22 and second additional switching PMOS transistor MPBAUX2 of the second switching transistors structure 324B are ON. Finally, the second NMOS transistor MNBO of the auxiliary switching block 332 of the auxiliary stage 330 is also ON.

Figure 5B:
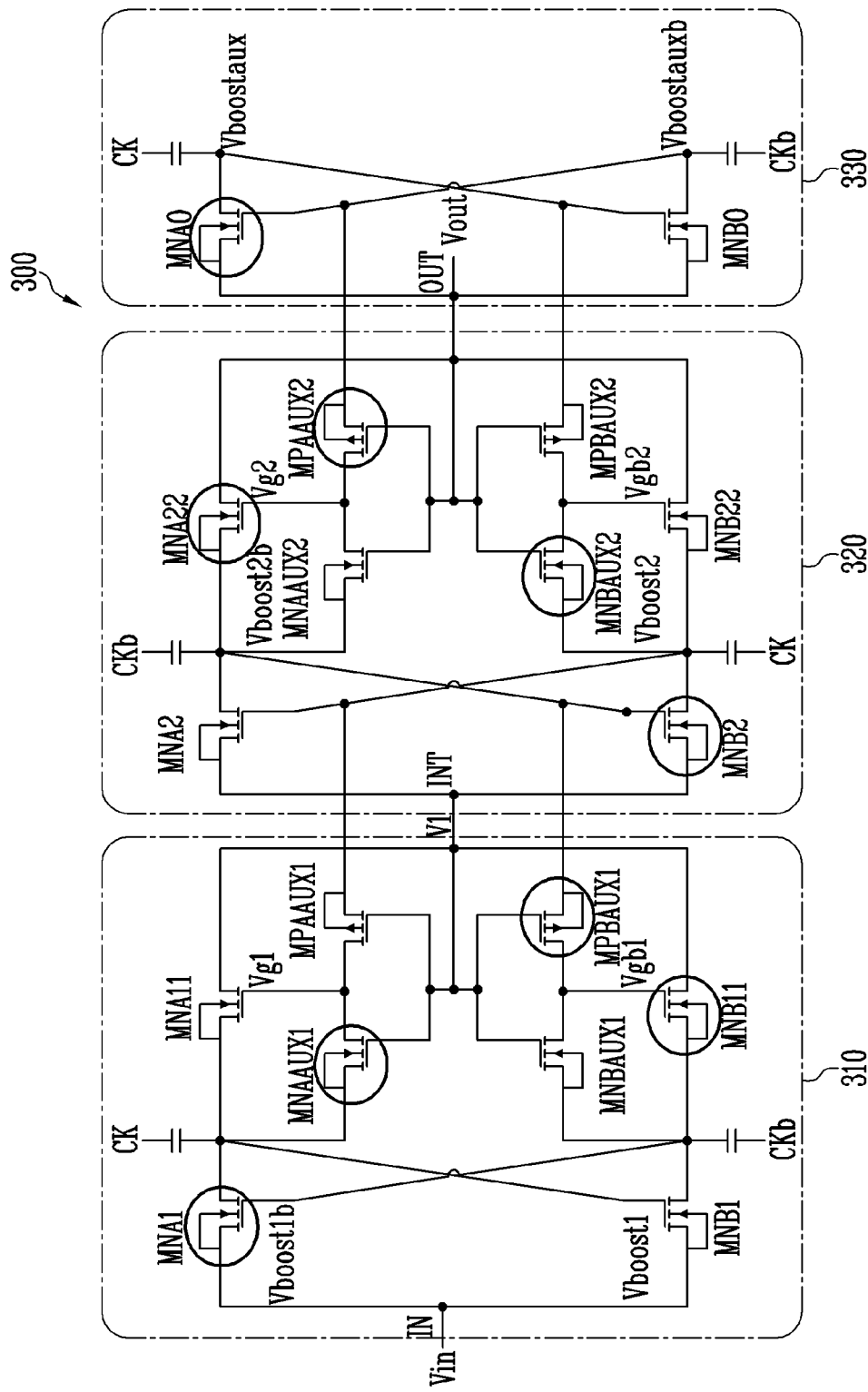

As shown in FIG. 5B, in a second time period T2, corresponding to a first falling of the clock signal CK to a value equal to 0, as indicated in FIG. 4, in the first stage 310, the first NMOS transistor MNA1 of the first switching block 312, the first additional switching NMOS transistor MNAAUX1 of the first switching transistors structure 314A as well as the first switching NMOS transistor MNB11 and second additional switching PMOS transistor MPBAUX1 of the second switching transistors structure 314B are ON. In a symmetrical manner, in the second stage 320, the second NMOS transistor MNB2 of the first switching block 322 and the first switching NMOS transistor MNA22 and second additional switching PMOS transistor MPAAUX2 of the first switching transistors structure 324A as well as the first additional switching NMOS transistor MNBAUX2 of the second switching transistors structure 324B are ON. Finally, the first NMOS transistor MNAO of the auxiliary switching block 332 of the auxiliary stage 330 is also ON.

Figure 6:
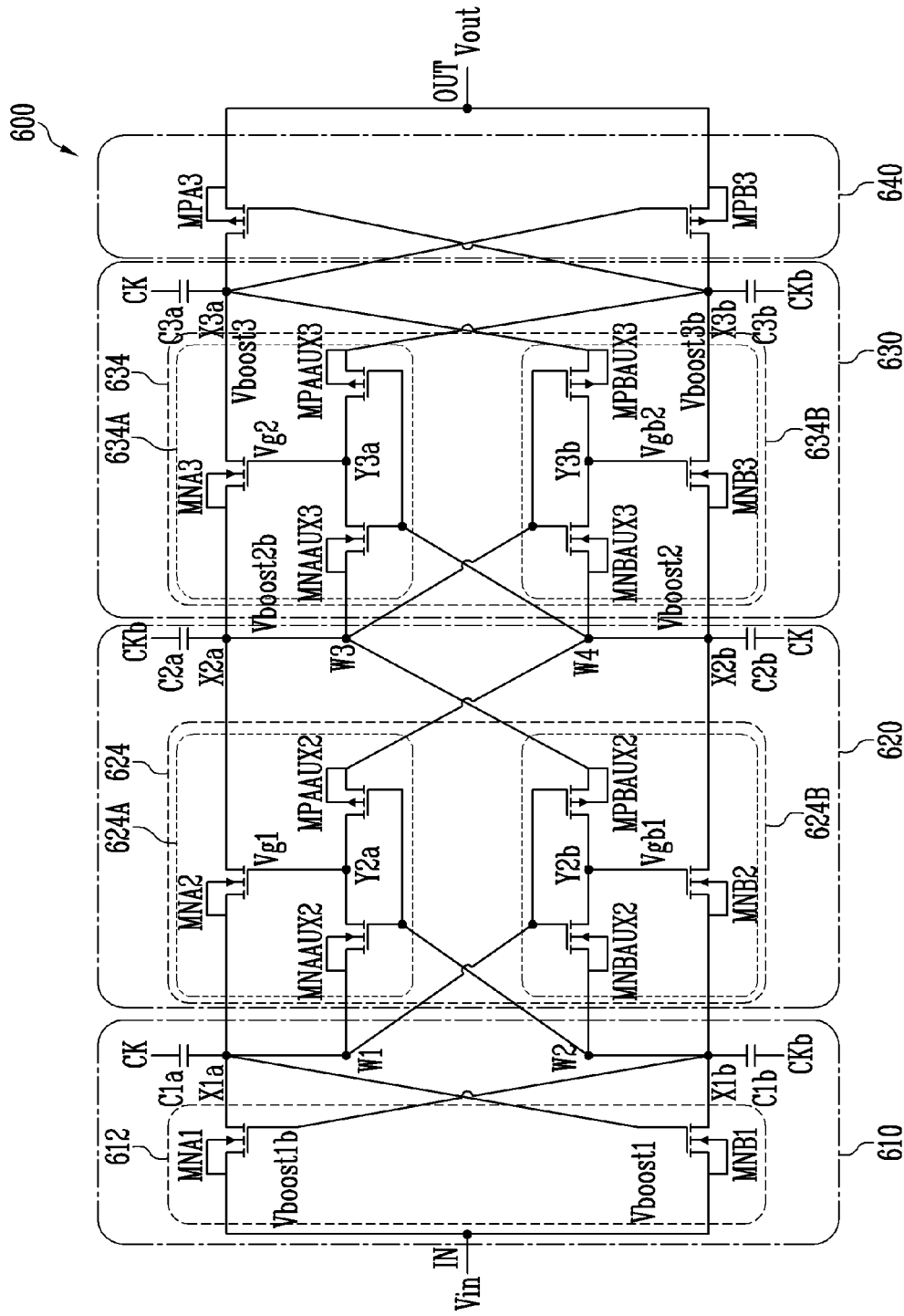
FIG. 6 shows a charge pump architecture according to an alternative embodiment of the present invention.

An alternative embodiment of the charge pump architecture is shown in FIG. 6.

The charge pump architecture 600 comprises a first or input stage 610 connected to an input terminal IN receiving a first or input voltage Vin and a last or output stage 640 connected to an output terminal OUT providing an output voltage Vout, interconnected by means of a first intermediate stage 620 and a second intermediate stage 630. The input stage 610 comprises a first couple of capacitors C1a, C1b respectively driven by a clock signal CK and an inverted clock signal CKb, the first intermediate stage 620 comprises a second couple of capacitors C2a, C2b, respectively driven by the inverted clock signal CKb and the clock signal CK and the second intermediate stage 630 comprises a third couple of capacitors C3a, C3b driven by the clock signal CK and the inverted clock signal CKb, respectively.

More particularly, the input stage 610 comprises an input switching block 612 connected between the input terminal IN and the first couple of capacitors C1a, C1b and including a first NMOS transistor MNA1 inserted between the input terminal IN and a first circuit node X1a, in turn connected to a first capacitor C1a of the first couple and a second NMOS transistor MNB1 inserted between the input terminal IN and a second circuit node X1b, in turn connected to a second capacitor C1b of the first couple. Moreover, the first NMOS transistor MNA1 has a control or gate terminal connected to the second circuit node X1b and the second NMOS transistor MNB1 has a control or gate terminal connected to the first circuit node X1a. The first NMOS transistor MNA1 provides the first capacitor C1a of the first couple with a first boost voltage Vboost1 at the first circuit node X1a, being also connected to the gate terminal of the second NMOS transistor MNB1, which in turn provides the second capacitor C1b of the first couple with a second inverted boost voltage Vboost1b at the second circuit node X1b, being also connected to the gate terminal of the first NMOS transistor MNA1. The first NMOS transistor MNA1 and the second NMOS transistor MNB1 may be triple-well NMOS transistors having bulk terminals connected to their source terminals in the embodiment of FIG. 6. However, other schemes known in the state of the art can be used to change the bulk terminal connection according to the charging pump phases to avoid bulk to drain forward biasing during boosting or charge pump output drop.

The first circuit node X1a and the second circuit node X1b of the input stage 610 are thus respectively first and second internal boosting nodes of the input stage 610.

The first intermediate stage 620 in turn comprises an intermediate switching block 624 inserted between the first couple of capacitors C1a, C1b and the second couple of capacitors C2a, C2b and connected to the first circuit node X1a and the second circuit node X1b of the input stage 610 and a first circuit node X2a and a second circuit node X2b of the first intermediate stage 620. More particularly, the intermediate switching block 624 includes a first switching transistors structure 624A inserted between the first circuit node X1a of the input stage 610 and the first circuit node X2a of the first intermediate stage 620 and a second switching transistors structure 624B inserted between the second circuit node X1b of the input stage 610 and the second circuit node X2b of the first intermediate stage 620.

The first switching transistors structure 624A and the second switching transistors structure 624B are also connected to a first interconnecting node W1, a second interconnecting node W2, a third interconnecting node W3 and a fourth interconnecting node W4. More particularly, the first switching transistors structure 624A comprises a first switching NMOS transistor MNA2 inserted between the first circuit node X1a of the input stage 610 and the first circuit node X2a of the first intermediate stage 620 and having a control or gate terminal connected to a first internal circuit node Y2a, a first additional switching NMOS transistor MNAAUX2 inserted between the first interconnecting node W1, in turn connected to the first circuit node X1a of the input stage 610, and the first internal circuit node Y2a and having a control or gate terminal connected to the second interconnecting node W2, in turn connected to the second circuit node X1b of the input stage 610, and a second additional switching PMOS transistor MPAAUX2 inserted between the first internal circuit node Y2a and the fourth interconnecting node W4, in turn connected to the second circuit node X2b of the first intermediate stage 620, and having a control or gate terminal connected to the second interconnecting node W2. The first switching NMOS transistor MNA2 and the first additional switching NMOS transistor MNAAUX2 of the first switching transistors structure 624A are triple-well NMOS transistors having bulk terminals connected to their source terminals in the embodiment of FIG. 6, however other schemes known in the state of the art can be used to change the bulk terminal connection according to the charging pump phases to avoid bulk to drain forward biasing during boosting or charge pump output drop. Second additional switching PMOS transistor MPAAUX2 of the first switching transistor structure 624A is on the other hand, a PMOS transistor with the bulk connected to its source. Also, for this PMOS transistor, a more complex scheme could be implemented to manage bulk connection to avoid drain to bulk forward biasing during boosting or charge pump output drop.

The first circuit node X2a and the second circuit node X2b of the first intermediate stage 620 are thus respectively first and second internal boosting nodes of the first intermediate stage 620.

In a symmetrical way, the second switching transistors structure 624B comprises a first switching NMOS transistor MNB2 inserted between the second circuit node X1b of the input stage 610 and the second circuit node X2b of the first intermediate stage 620 and having a control or gate terminal connected to a second internal circuit node Y2b, a first additional switching NMOS transistor MNBAUX2 inserted between the second interconnecting node W2 and a second internal circuit node Y2b and having a control or gate terminal connected to the first interconnecting node W1, in turn connected to the first circuit node X1a of the input stage 610, and a second additional switching PMOS transistor MPBAUX2 inserted between the second internal circuit node Y2b and a third interconnecting node W3, in turn connected to the first circuit node X2a of the first intermediate stage 620, and having a control or gate terminal connected to the first interconnecting node W1. The first switching NMOS transistor MNB2 and the first additional switching NMOS transistor MNBAUX2 of the second switching transistors structure 624B may be triple-well NMOS transistors having bulk terminals connected to their source terminals in the embodiment of FIG. 6. However, other schemes known in the state of the art can be used to change the bulk terminal connection according to the charging pump phases to avoid bulk to drain forward biasing during boosting or charge pump output drop. Second additional switching PMOS transistor MPBAUX2 of the second switching transistor structure 624B is on the other hand, a PMOS transistor with the bulk connected to its source. Also, for this PMOS transistor, a more complex scheme could be implemented to manage bulk connection to avoid drain to bulk forward biasing during boosting or charge pump output drop. The first internal circuit node Y2a is at a first control voltage Vg1 and the second internal circuit node Y2b is at an inverted first control voltage Vgb1.

Moreover, the first NMOS transistor MNA2 of the first switching transistors structure 624A provides the first capacitor C2a of the second couple with a third inverted boost voltage Vboost2b at the first circuit node X2a of the first intermediate stage 620 and the first NMOS transistor MNB2 of the second switching transistors structure 624B provides the second capacitor C2b of the second couple with a fourth boost voltage Vboost2 at the second circuit node X2b of the first intermediate stage 620.

Similarly, the second intermediate stage 630 comprises an output switching block 634 inserted between the second couple of capacitors C2a, C2b and the third couple of capacitors C3a, C3b and connected to the first circuit node X2a and the second circuit node X2b of the first intermediate stage 620 and a first circuit node X3a and a second circuit node X3b of the second intermediate stage 630. More particularly, the output switching block 634 includes a first switching transistors structure 634A inserted between the first circuit node X2a of the first intermediate stage 620 and the first circuit node X3a of the second intermediate stage 630 and a second switching transistors structure 634B inserted between the second circuit node X2b of the first intermediate stage 620 and the second circuit node X3b of the second intermediate stage 630.

The first switching transistors structure 634A comprises a first switching NMOS transistor MNA3 inserted between the first circuit node X2a of the first intermediate stage 620 and the first circuit node X3a of the second intermediate stage 630 and having a control or gate terminal connected to a first internal circuit node Y3a, a first additional switching NMOS transistor MNAAUX3 inserted between the third interconnecting node W3 and the first internal circuit node Y3a and having a control or gate terminal connected to the fourth interconnecting node W4 and a second additional switching PMOS transistor MPAAUX3 inserted between the first internal circuit node Y3a and the second circuit node X3b of the second intermediate stage 630, and having a control or gate terminal connected to the fourth interconnecting node W4. The first switching NMOS transistor MNA3 and the first additional switching NMOS transistor MNAAUX3 of the first switching transistors structure 634A may be triple-well NMOS transistors having bulk terminals connected to their source terminals in the embodiment of FIG. 6. However, other schemes known in the state of the art can be used to change the bulk terminal connection according to the charging pump phases to avoid bulk to drain forward biasing during boosting or charge pump output drop. Second additional switching PMOS transistor MPAAUX3 of the first switching transistor structure 634A is on the other hand, a PMOS transistor with the bulk connected to its source. Also, for this PMOS transistor a more complex scheme could be implemented to manage bulk connection to avoid drain to bulk forward biasing during boosting or charge pump output drop.

In a symmetrical way, the second switching transistors structure 634B comprises a first switching NMOS transistor MNB3 inserted between the second circuit node X2b of the first intermediate stage 620 and the second circuit node X3b of the second intermediate stage 630 and having a control or gate terminal connected to a second internal circuit node Y3b, a first additional switching NMOS transistor MNBAUX3 inserted between the fourth interconnecting node W4 and a second internal circuit node Y3b and having a control or gate terminal connected to the third interconnecting node W3 and a second additional switching PMOS transistor MPBAUX3 inserted between the second internal circuit node Y3b and the first circuit node X3a of the second intermediate stage 630, and having a control or gate terminal connected to the third interconnecting node W3. The first switching NMOS transistor MNB3 and the first additional switching NMOS transistor MNBAUX3 of the second switching transistors structure 634B may be triple-well NMOS transistors having bulk terminals connected to their source terminals in the embodiment of FIG. 6. However, other schemes known in the state of the art can be used to change the bulk terminal connection according to the charging pump phases to avoid bulk to drain forward biasing during boosting or charge pump output drop. Second additional switching PMOS transistor MPBAUX3 of the second switching transistor structure 634B is on the other hand, a PMOS transistor with the bulk connected to its source. Also, for this PMOS transistor a more complex scheme could be implemented to manage bulk connection to avoid drain to bulk forward biasing during boosting or charge pump output drop. The first internal circuit node Y3a is at a second control voltage Vg2 and the second internal circuit node Y3b is at an inverted first control voltage Vgb2.

The first circuit node X3a and the second circuit node X3b of the second intermediate stage 630 are thus respectively first and second internal boosting nodes of the second intermediate stage 630.

The first NMOS transistor MNA3 of the first switching transistors structure 634A provides the first capacitor C3a of the third couple with a fifth boost voltage Vboost3 at the first circuit node X3a, and the first NMOS transistor MNB3 of the second switching transistors structure 634B provides the second capacitor C3b of the third couple with a sixth inverted boost voltage Vboost3b at the second circuit node X3b.

The charge pump architecture 600 further comprises an output stage 640 inserted between the third couple of capacitors C3a, C3b and the output terminal OUT. More particularly, the output stage 640 includes a first PMOS transistor MPA3 inserted between the first circuit node X3a, in turn connected to a first capacitor C3a of the third couple, and the output terminal OUT and a second PMOS transistor MPB3 inserted between the second circuit node X3b, in turn connected to a second capacitor C3b of the third couple and the output terminal OUT. Moreover, the first PMOS transistor MPA3 has a control or gate terminal connected to the second circuit node X3b and the second PMOS transistor MPB3 has a control or gate terminal connected to the first circuit node X3a. The first PMOS transistor MPA3 and the second PMOS transistor MPB3 have their bulk terminals connected to their source terminals, however a more complex scheme could be implemented to manage bulk connection to avoid drain to bulk forward biasing during boosting or charge pump output drop.

According to this embodiment, the charge pump architecture 600 comprises: an input terminal IN and an output terminal OUT; the first or input stage 610 receiving the input voltage Vin as a first voltage at its input terminal, being also the input terminal IN of the charge pump and outputting the first boost voltage Vboost1 and the second boost voltage Vboost1b at its first and second output terminals X1a, X1b; the first intermediate stage 620 connected to the first and second output terminals X1a, X1b of first stage 610, being a first couple of internal boosting nodes and receiving therefrom the first boost voltage Vboost1 and the second boost voltage Vboost1b of the input stage 610 and outputting a third boost voltage Vboost2b and a fourth boost voltage Vboost2 at its first and second output terminals X2a, X2b; the second intermediate stage 630 connected to the first and second output terminals X2a, X2b of first intermediate stage 620, being a second couple of internal boosting nodes and receiving therefrom the third boost voltage Vboost2b and the fourth boost voltage Vboost2 of the first intermediate stage 620 and outputting the fifth boost voltage Vboost3 and the sixth boost voltage Vboost3b at its first and second output terminals X3a, X3b, and the final or output stage 640 connected to the first and second output terminals X3a, X3b of second intermediate stage 630, being a third couple of internal boosting nodes and receiving therefrom the fifth boost voltage Vboost3 and the sixth boost voltage Vboost3b of the second intermediate stage 630 and outputting the output voltage Vout at its output terminal, being also the output terminal OUT of the charge pump, wherein the first stage 610 comprises a first couple of capacitors C1a, C1b connected to the first couple of boosting nodes X1a, X1b, the first intermediate stage 620 comprises a second couple of capacitors C2a, C2b connected to the second couple of internal boosting nodes X2a, X2b and the second intermediate stage 630 comprises a third couple of capacitors C3a, C3b connected to respective third couple of internal boosting nodes X3a, X3b.

The first stage 610 also includes first type of MOS transistors, in particular NMOS transistors MNA1, MNB1 transferring the input voltage Vin to its first and second output terminals X1a, X1b.

Furthermore, the first intermediate stage 620 includes: a couple of input terminals coupled to the output terminals X1a and X1b of the first stage 610 and a couple of output terminals X2a, X2b; second type of MOS transistors, in particular NMOS transistors MNA2, MNB2 transferring the first boost voltage Vboost1 and the second boost voltage Vboost1b at the first and second input terminals X1a, X1b to first and second output terminals X2a, X2b of the first intermediate stage 620; and third type of MOS transistors, in particular NMOS transistors MNAAUX2, MNBAUX2 connecting the gates of the second type of MOS transistors MNA2, MNB2 to input terminals; and fourth type of MOS transistors, in particular PMOS transistors MPAAUX2, MPBAUX2 connecting the gates of second type of MOS transistors MNA2, MNB2 to the second and first output terminals X2b, X2a, respectively, in turn connected to the next stage, in particular the second intermediate stage 630.

Similarly, the second intermediate stage 630 includes: a couple of input terminals coupled to the output terminals X2a and X2b of the first intermediate stage 620 and a couple of output terminals X3a, X3b; second type of MOS transistors, in particular NMOS transistors MNA3, MNB3 transferring the third boost voltage Vboost2b and the fourth boost voltage Vboost2 at input terminals to first and second output terminals X3a, X3b of the second intermediate stage 630; third type of MOS transistors, in particular NMOS transistors MNAAUX3, MNBAUX3 connecting the gates of second type of MOS transistors MNA3, MNB3 to input terminals; and fourth type of MOS transistors, in particular PMOS transistors MPAAUX3, MPBAUX3 connecting the gates of second type of MOS transistors MNA3, MNB3 to the output terminals X3b, X3a, respectively, in turn connected to the next stage, in particular the final or output stage 640.

Finally, the final or output stage 640 includes: a couple of input terminals coupled to output terminals X3a, X3b of second intermediate stage 630 and one output terminal OUT, being also the output terminal of the charge pump; fifth type of MOS transistors, in particular PMOS cross-coupled transistors MPA3, MPB3 transferring the fifth boost voltage Vboost3 and sixth boost voltage Vboost3b at input terminals to the output terminal OUT.

The charge pump architecture 600 of FIG. 6 is a 3-stage charge pump, the constituent stages thereof being the input stage 610, the first intermediate stage 620, the second intermediate stage 630 and the output stage 640, however any number of stages can be inserted to make a N-stage charge pump.

Figure 7:
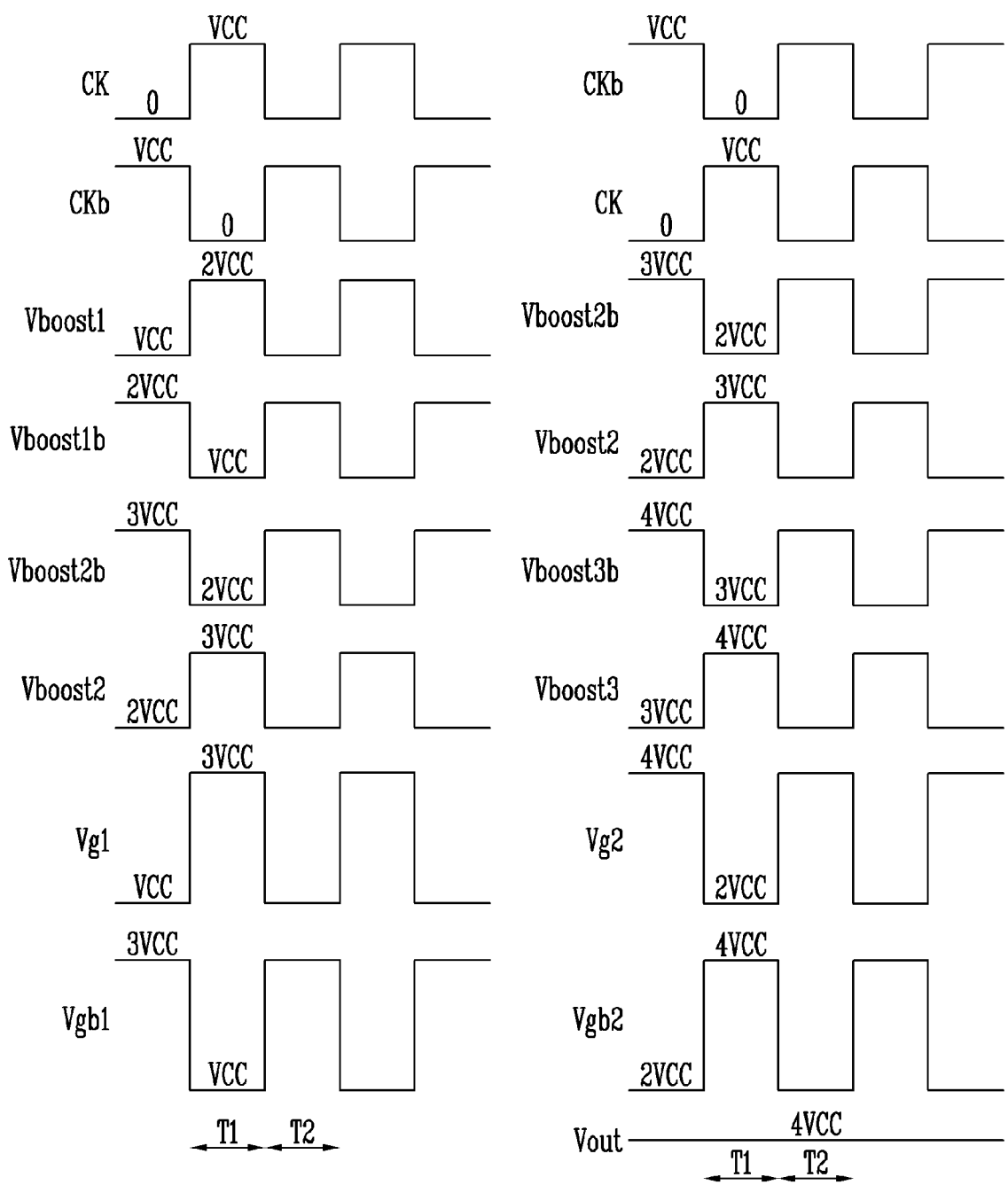
FIG. 7 shows internal signals of the charge pump architecture of FIG. 6 according to an embodiment of the present invention.

The voltage and clock signals of the charge pump architecture 600 are shown in FIG. 7.

In particular, the input stage 610 receives the input voltage Vin at its input terminal IN having a value equal to VCC and is driven by the clock signal CK and the inverted clock signal CKb ranging between 0 and VCC. Moreover, the first boost voltage Vboost1 and second boost voltage Vboost1b at the first circuit node X1a and second circuit node X1b of the input stage 610, respectively, range between VCC and 2VCC.

The first boost voltage Vboost1 and second boost voltage Vboostb are provided to the first interconnecting node W1 and to the second interconnecting node W2 connected to the first intermediate stage 620.

In the first intermediate stage 620, the first control voltage Vg1 and inverted first control voltage Vgb1 at the first internal circuit node Y2a and second internal circuit node Y2b of the first intermediate stage 620, respectively, range between VCC and 3VCC and the third boost voltage Vboostb2 and fourth boost voltage Vboost1 at the first circuit node X2a and second circuit node X2b of the first intermediate stage 620, respectively, range between 2VCC and 3VCC and are provided to the third interconnecting node W3 and to the fourth interconnecting node W4, respectively.

Similarly, in the second intermediate stage 630, the fifth boost voltage Vboost3 and the sixth boost voltage Vboost3b at the first circuit node X3a and second circuit node X3b of the second intermediate stage 630, respectively range between 3VCC and 4VCC and the second control voltage Vg2 and inverted second control voltage Vgb2 at the first internal circuit node Y3a and second internal circuit node Y3b of the second intermediate stage 630, respectively, range between 2VCC and 4VCC.

In this way, the charge pump architecture 600 provides at the output terminal OUT an output voltage Vout having a value of 4VCC.

The patterns of the signals shown in FIG. 7 in the charge pump architecture 600 of FIG. 6 provide for alternative on-phases of the transistors included therein.

Figure 8A:
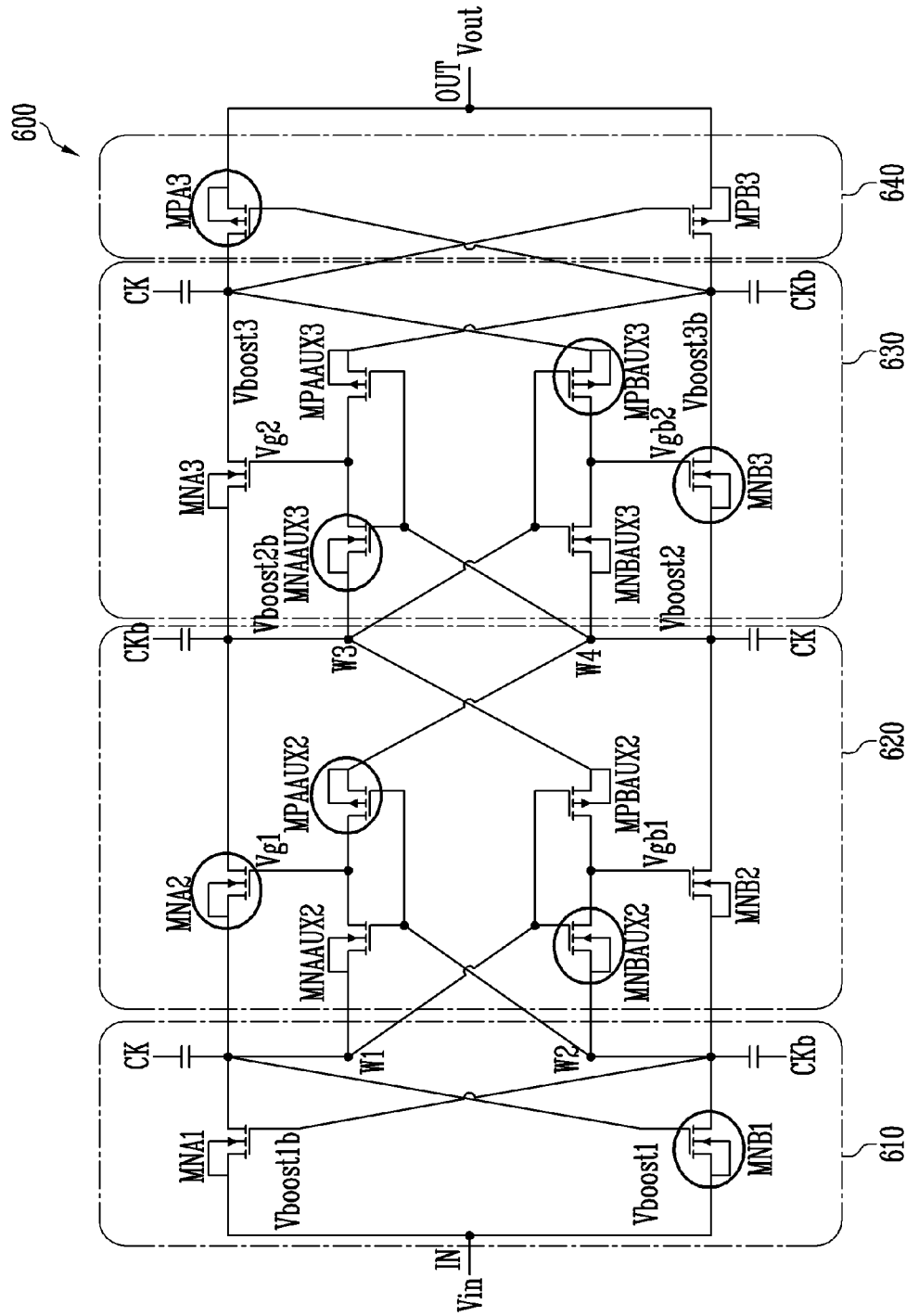
FIGS. 8A-8B show the on transistors of the charge pump architecture of FIG. 6 in different working phases according to an embodiment of the present invention.

More particularly, as shown in FIG. 8A, in a first time period T1, corresponding to a first rising of the clock signal CK to a value equal to VCC, as indicated in FIG. 7, in the input stage 610, the second NMOS transistor MNB1 of the first switching block 612 is ON. Moreover, in the first intermediate stage 620, the first switching NMOS transistor MNA2 and second additional switching PMOS transistor MPAAUX2 of the first switching transistors structure 624A as well as the first additional switching NMOS transistor MNBAUX2 of the second switching transistors structure 624B are ON. In a symmetrical manner, in the second intermediate stage 630, the first additional switching NMOS transistor MNAAUX3 of the first switching transistors structure 634A as well as the first switching NMOS transistor MNB3 and second additional switching PMOS transistor MPBAUX3 of the second switching transistors structure 634B are ON. Finally, the first PMOS transistor MPA3 of the output stage 640 is also ON.

Figure 8B:
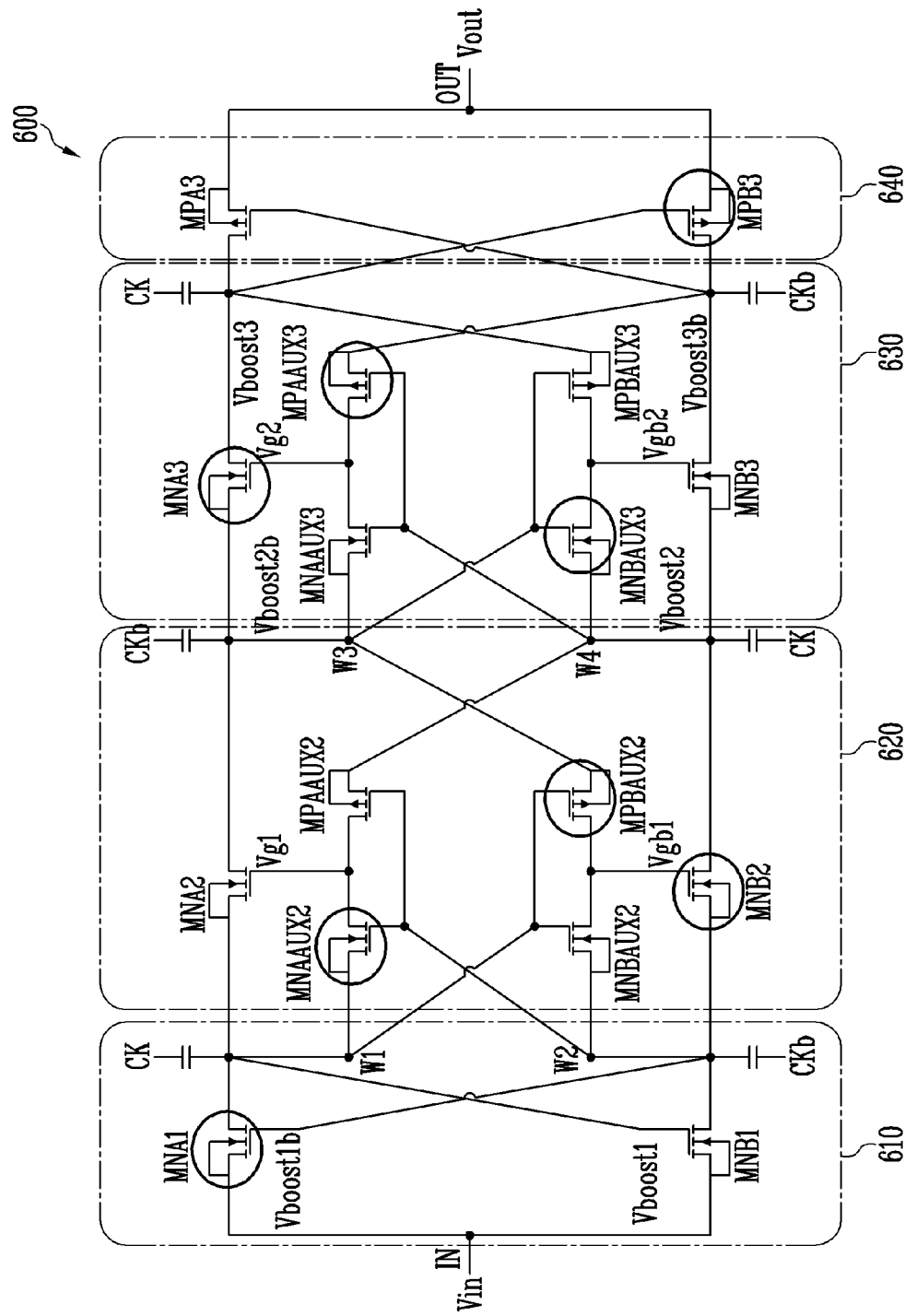

As shown in FIG. 8B, in a second time period T2, corresponding to a first falling of the clock signal CK to a value equal to 0, as indicated in FIG. 7, in the input stage 610, the first NMOS transistor MNA1 of the first switching block 612 is ON. Moreover, in the first intermediate stage 620, the first additional switching NMOS transistor MNAAUX2 of the first switching transistors structure 624A as well as the first switching NMOS transistor MNB2 and second additional switching PMOS transistor MPBAUX2 of the second switching transistors structure 624B are ON. In a symmetrical manner, in the second intermediate stage 630, the first switching NMOS transistor MNA3 and second additional switching PMOS transistor MPAAUX3 of the first switching transistors structure 634A as well as the first additional switching NMOS transistor MNBAUX3 of the second switching transistors structure 324B are ON. Finally, the second NMOS transistor MNB3 of the output stage 640 is also ON.

According to another embodiment, the clock signal and inverted clock signal connected to each stage of the charge pump architecture are suitably shifted from one another. In particular, a delay period Tdelay is inserted in the clock signal and inverted clock signal driving a stage to anticipate the shifted clock signals with respect to the clock signal and inverted clock signal of a previous stage, as indicated in FIG. 9 for a sequence of three stages driven by a first clock signal φ1 and an inverted first clock signal φ1-N, a second clock signal φ2 and an inverted second clock signal φ2-N and a third clock signal φ3 and an inverted third clock signal φ3-N, respectively, the second clock signal φ2 and inverted second clock signal φ2-N being anticipated by the delay period Tdelay with respect to the first clock signal φ1 and inverted first clock signal φ1-N and the third clock signal φ3 and inverted third clock signal φ3-N being anticipated by the delay period Tdelay with respect to the second clock signal φ2 and inverted second clock signal φ2-N.

It can be verified that the shifting between the clock signal and inverted clock signal of different stages is able to reduce the so called back charge conduction effect, thereby improving the efficiency of the charge pump architecture driving the shifted clock signals and inverted clock signals.

The charge pump architecture according to the embodiments, using NMOS transistors having higher conductance than PMOS transistors, allows to reduce the area of the switching blocks and switching transistors structures included therein at same conductance, thus reducing silicon area and parasitic capacitance of the architecture as a whole. Alternatively, at a same area, the dissipated power can be reduced.

Moreover, using shifting between the clock signal and inverted clock signal to drive different stages, the charge pump architecture according to the embodiments shows a reduced back charge conduction effect.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A charge pump architecture comprising:
an input terminal and an output terminal;
a first stage receiving a first voltage at its input terminal and outputting a second voltage at its output terminal, the first stage including a first couple of capacitors connected to a first couple of internal boosting nodes;
a second stage receiving the second voltage at its input terminal and outputting a third voltage at its output terminal, the second stage including a second couple of capacitors connected to a second couple of internal boosting nodes; and
an auxiliary stage receiving the third voltage at its input terminal, the auxiliary stage including a third couple of capacitors connected to a third couple of internal boosting nodes,
wherein the input terminal of the charge pump architecture corresponds to the input terminal of the first stage, and the output terminal of the charge pump architecture corresponds to the output terminal of the second stage and the input terminal of the auxiliary stage, and
wherein each of the first stage and second stage comprises:
the input terminal and the output terminal of the stage;

a first type of MOS transistors transferring the voltage from the input terminal to the couple of internal boosting nodes and being cross-coupled; and a second type of MOS transistors with their gate biased by a third type of MOS transistors and a fourth type of MOS transistors;

the third type of MOS transistors connecting the gates of the second type of MOS transistors to the couple of internal boosting nodes of the stage; and the fourth type of MOS transistors connecting the gates of the second type of MOS transistors to the couple of internal boosting nodes of the next stage.

2. The charge pump architecture of claim 1, wherein the auxiliary stage further includes first types of MOS transistors transferring a voltage from an input terminal to the third couple of internal boosting nodes and being cross coupled.

3. The charge pump architecture of claim 1, wherein each of the first stage and the second stage comprises:

the couple of capacitors in which a first capacitor of the couple is driven by a clock signal and a second capacitor of the couple is driven by an inverted clock signal;

the couple of internal boosting nodes including a first internal boosting node, connected to the first capacitor of the couple and a second internal boosting node, connected to the second capacitor of the couple;

a first switching block connected between the input terminal of the stage and the first and second internal boosting nodes; and a second switching block connected between the first and second internal boosting nodes and the output terminal of the stage.

4. The charge pump architecture of claim 3, wherein the first switching block includes:

a first NMOS transistor of the first type inserted between the input terminal of the stage and the first internal boosting node; and a second NMOS transistor of the first type inserted between the input terminal of the stage, and the second internal boosting node, and wherein the first NMOS transistor has a control terminal connected to the second internal boosting node and the second NMOS transistor has a control terminal connected to the first internal boosting node.

5. The charge pump architecture of claim 4, wherein the first NMOS transistor and second NMOS transistor of the first switching block are triple-well NMOS transistors having bulk terminals connected to their source terminals.

6. The charge pump architecture of claim 3, wherein the second switching block includes:

a first switching transistors structure inserted between the first internal boosting node and the output terminal of the stage; and a second switching transistors structure inserted between the second internal boosting node and the output terminal of the stage, and wherein the first switching transistors structure and second switching transistors structure are interconnected to one another at the output terminal of the stage.

7. The charge pump architecture of claim 6, wherein the first switching transistors structure includes:

a first internal circuit node;
a first interconnecting node;
a first switching NMOS transistor of the second type inserted between the first internal boosting node and the output terminal of the stage and having a control terminal connected to the first internal circuit node;

a first additional switching NMOS transistor of the third type inserted between the first internal boosting node and the first internal circuit node and having a control terminal connected to the output terminal of the stage; and a second additional switching PMOS transistor of the fourth type inserted between the first internal circuit node and the first interconnecting node and having a control terminal connected to the output terminal of the stage, and wherein the second switching transistors structure includes:

a second internal circuit node:
a second interconnecting node;
a first switching NMOS transistor of the second type inserted between the second internal boosting node and the output terminal of the stage, and having a control terminal connected to the second internal circuit node;

a first additional switching NMOS transistor of the third type inserted between the second internal boosting node and the second internal circuit node and having a control terminal connected to the output terminal of the stage; and a second additional switching PMOS transistor of the fourth type inserted between the second internal circuit node and the second interconnecting node and having a control terminal connected to the output terminal of the stage.

8. The charge pump architecture of claim 7, wherein the first switching NMOS transistor and the first additional switching NMOS transistor of the first switching transistors structure as well as the first switching NMOS transistor and the first additional switching NMOS transistor of the second switching transistors structure are triple-well NMOS transistors having bulk terminals connected to their source terminals, while the second additional switching PMOS transistor of the first switching transistors structure and the second additional switching PMOS transistor of the second switching transistors structure are PMOS transistors with the bulk connected to their source.

9. The charge pump architecture of claim 7, wherein the first interconnecting node of the first stage is coupled to the second internal boosting node of the second stage and the second interconnecting node of the first stage is coupled to the first boosting internal node of second stage.

10. The charge pump architecture of claim 9, wherein the third couple of capacitors of the auxiliary stage are driven by the clock signal and the inverted clock signal, respectively.

11. The charge pump architecture of claim 10, wherein the auxiliary stage comprises:

a first internal boosting node connected to a first capacitor of the third couple and a second internal boosting node connected to a second capacitor of the third couple; and an auxiliary switching block including:
a first NMOS transistor of the first type inserted between the input terminal of the stage and the first internal boosting node; and a second NMOS transistor of the first type inserted between the input terminal of the stage and the second internal boosting node, and wherein the first NMOS transistor has a control terminal connected to the second internal boosting node and the second NMOS transistor has a control terminal connected to the first internal boosting node.

12. The charge pump architecture of claim 11, wherein the first NMOS transistor and second NMOS transistor of the auxiliary switching block are triple-well transistors having bulk terminals connected to the source terminals.

13. The charge pump architecture of claim 11, wherein the first interconnecting node of the second stage is coupled to the second internal boosting node of the auxiliary stage and the second interconnecting node of the second stage is coupled to the first internal boosting node of the auxiliary stage.

14. The charge pump architecture of claim 9 wherein a plurality of additional stages are serially connected to the auxiliary stage by having the first interconnecting node of a stage connected to the second internal boosting node of a next stage and the second interconnecting node of a stage connected to the first internal boosting node of the next stage.

15. The charge pump architecture of claim 10, wherein the clock signal and the inverted clock signal driving each of the stages are shifted from one another by a delay period, inserted in the clock signal and inverted clock signal driving a stage to anticipate the shifted clock signals with respect to the clock signal and the inverted clock signal of a previous stage.

16. A charge pump architecture comprising:
a first stage suitable for receiving a first voltage at an input terminal and outputting a second voltage through an internal node;
a second stage suitable for receiving the second voltage and outputting an output voltage through an output node; and
an auxiliary stage connected to the output node,
wherein the first stage includes:
a first couple of capacitors respectively connected to first and second internal boosting nodes thereof;
first-type MOS transistors cross-coupled and respectively suitable for transferring the input voltage to the first and second internal boosting nodes thereof;
second-type MOS transistors respectively suitable for transferring voltages from the first and second internal boosting nodes thereof to the internal node;
third-type MOS transistors respectively suitable for connecting gates of the second-type MOS transistors thereof to first and second internal boosting nodes thereof; and
fourth-type MOS transistors respectively suitable for connecting the gates of the second-type MOS transistors thereof to first and second internal boosting nodes of the second stage,
wherein the second stage includes:
a second couple of capacitors respectively connected to the first and second internal boosting nodes thereof;
first-type MOS transistors cross-coupled and respectively suitable for transferring the second voltage from the internal node to the first and second internal boosting nodes thereof;
second-type MOS transistors respectively suitable for transferring voltages from the first and second internal boosting nodes thereof to the output node;
third-type MOS transistors respectively suitable for connecting gates of the second-type MOS transistors thereof to the first and second internal boosting nodes thereof; and
fourth-type MOS transistors respectively suitable for connecting the gates of the second-type MOS transistors thereof to first and second internal boosting nodes of auxiliary stage, and
wherein the auxiliary stage includes:
a third couple of capacitors respectively connected to the first and second internal boosting nodes thereof; and
first-type MOS transistors connected to the output node and cross-coupled.

* * * * *